(12) United States Patent
Sala

(10) Patent No.: US 10,316,915 B2
(45) Date of Patent: Jun. 11, 2019

(54) BRAKE GEAR MOTOR GROUP

(71) Applicant: FRENI BREMBO S.P.A., Curno (IT)

(72) Inventor: Paolo Sala, Curno (IT)

(73) Assignee: Freni Brembo S.P.A. (IT)

( * ) Notice: Subject to any disclaimer, the term of this patent is extended or adjusted under 35 U.S.C. 154(b) by 101 days.

(21) Appl. No.: 15/301,098

(22) PCT Filed: Apr. 1, 2015

(86) PCT No.: PCT/IB2015/052410
§ 371 (c)(1),
(2) Date: Sep. 30, 2016

(87) PCT Pub. No.: WO2015/151052
PCT Pub. Date: Oct. 8, 2015

(65) Prior Publication Data
US 2017/0023081 A1    Jan. 26, 2017

(30) Foreign Application Priority Data

Apr. 1, 2014   (IT) .............................. MI2014A0565
Apr. 1, 2014   (IT) .............................. MI2014A0567
(Continued)

(51) Int. Cl.
*B60L 7/00*         (2006.01)
*F16D 65/18*      (2006.01)
(Continued)

(52) U.S. Cl.
CPC .............. *F16D 65/18* (2013.01); *B60T 13/74* (2013.01); *F16D 55/226* (2013.01);
(Continued)

(58) Field of Classification Search
CPC .................................................. F16D 2125/50
See application file for complete search history.

(56) References Cited

U.S. PATENT DOCUMENTS 6,736,233 B2    5/2004   Beishline et al.
7,021,415 B2    4/2006   Farmer et al.
(Continued)

FOREIGN PATENT DOCUMENTS

DE    10 2004 048 700 A1    5/2006
DE    10 2010 032 053 A1    1/2012
(Continued)

OTHER PUBLICATIONS

International Search Report dated Jul. 20, 2015 in corresponding PCT patent application No. PCT/IB2015/052410.

*Primary Examiner* — Nicholas J Lane
(74) *Attorney, Agent, or Firm* — Waller Lansden Dortch & Davis, LLP; Matthew C. Cox

(57) ABSTRACT

A brake gear motor (1) comprising an electric motor (2) having a motor shaft (3); a reducer (4) operatively connected, with its input side (9), to said motor shaft (3), to receive a movement and a driving torque and transmit them with its side output (10) to the brake; a housing (5) having at least one chamber (6, 28, 29); said at least one chamber (6, 28, 29) being at least partly delimited by at least one chamber wall or mantle (7) wherein a support plate (8) is provided in said housing; said motor (2) is accommodated, at least in part, in said at least one chamber (6, 28, 29); said motor shaft (3) is supported freely rotatable in said support plate (8); said reducer (4) is accommodated in said at least one chamber (6, 28, 29); said reducer (4) is supported freely rotatable in said support plate (8); said housing (5) comprises a connection rim to the brake (11) suitable to couple said housing (5) to a brake calliper (12) so as to interface with said output side (10) of the brake and allow the movement of at least one brake pad (13) towards and away from a disc brake disc (14) and exert a braking action; and in which said support plate (8) divides said housing in three chambers (6, 28, 29), a first chamber (6) accommodates the (Continued)

output side (10) of the reducer (4), a second chamber (28) houses at least a part of the electric motor (2), a third chamber (29) houses the input side (9) of the reducer (4) or side of the reducer connected to the electric motor (2), wherein said second chamber (28) is closed by a first cover (40) substantially cup-shaped, selected from a set of cup-shaped covers, that forms a first cover compartment (46) of a predefined size and suitable for housing a portion of a specific size of electric motor (2), in order to adapt said brake gear motor group (1) to different applications, by changing only said first cover (40) in said of first covers, and keeping the housing (5) unchanged.

26 Claims, 21 Drawing Sheets

(30) Foreign Application Priority Data

| | | | |
|---|---|---|---|
| Apr. 1, 2014 | (IT) | ................ | MI2014A0568 |
| Apr. 1, 2014 | (IT) | ................ | MI2014A0569 |
| Apr. 1, 2014 | (IT) | ................ | MI2014A0570 |
| Apr. 1, 2014 | (IT) | ................ | MI2014A0572 |
| Apr. 1, 2014 | (IT) | ................ | MI2014A0573 |

(51) Int. Cl.
| | |
|---|---|
| *B60T 13/74* | (2006.01) |
| *F16D 55/226* | (2006.01) |
| *F16D 55/00* | (2006.01) |
| *F16D 121/24* | (2012.01) |
| *F16D 125/48* | (2012.01) |
| *F16D 125/50* | (2012.01) |
| *F16D 125/40* | (2012.01) |
| *F16H 37/04* | (2006.01) |

(52) U.S. Cl.
CPC ............... *F16D 2055/002* (2013.01); *F16D 2055/0037* (2013.01); *F16D 2121/24* (2013.01); *F16D 2125/40* (2013.01); *F16D 2125/48* (2013.01); *F16D 2125/50* (2013.01); *F16H 37/041* (2013.01)

(56) References Cited

U.S. PATENT DOCUMENTS

| | | | |
|---|---|---|---|
| 8,403,337 B1 | 3/2013 | Gilstad et al. | |
| 2004/0178028 A1* | 9/2004 | Farmer | B60T 13/741 188/162 |
| 2005/0064980 A1* | 3/2005 | Hoshi | F16D 7/021 475/257 |
| 2010/0163351 A1* | 7/2010 | Sakashita | B60T 7/107 188/182 |
| 2011/0147143 A1 | 6/2011 | Park | |
| 2012/0261220 A1 | 10/2012 | Sakashita | |
| 2013/0180811 A1* | 7/2013 | Poertzgen | B60T 13/741 188/156 |
| 2014/0166413 A1* | 6/2014 | Giering | B60T 13/741 188/156 |
| 2015/0308528 A1* | 10/2015 | Ambs | B60T 7/107 188/162 |
| 2015/0308529 A1* | 10/2015 | Ambs | B60T 7/107 188/162 |

FOREIGN PATENT DOCUMENTS

| | | |
|---|---|---|
| EP | 1 767 806 A2 | 3/2007 |
| KR | 10-2012-0048232 A | 5/2012 |
| KR | 10-1321719 B1 | 10/2013 |
| WO | 00/61962 A1 | 10/2000 |
| WO | 2011/076299 A1 | 6/2011 |

* cited by examiner

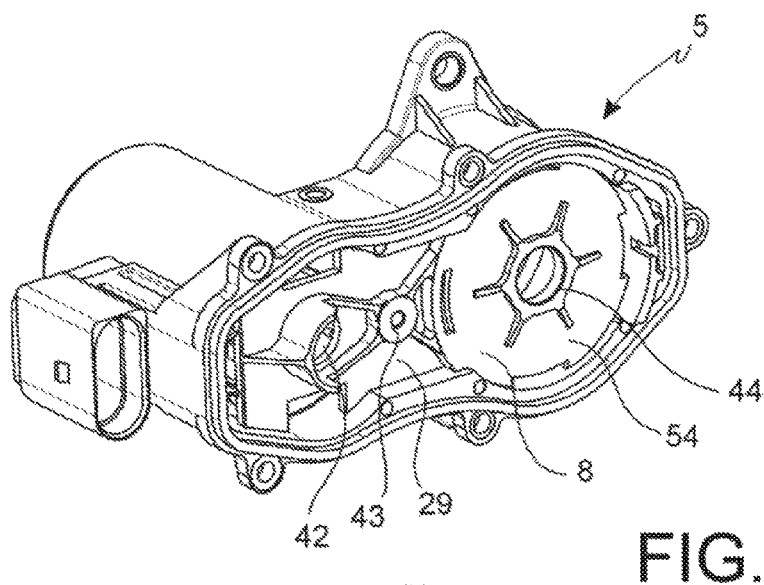
FIG. 13
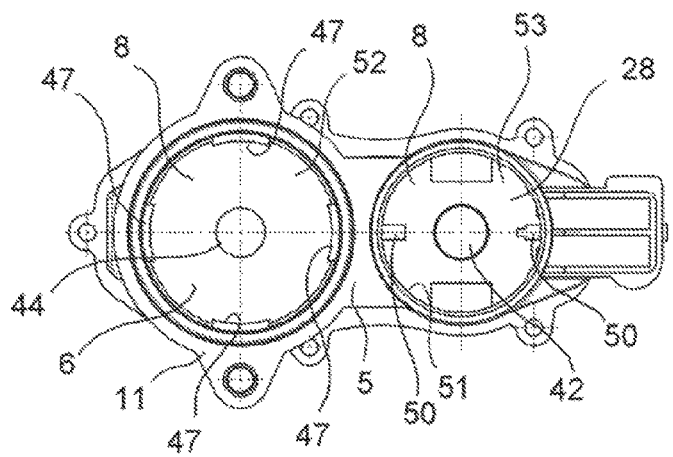
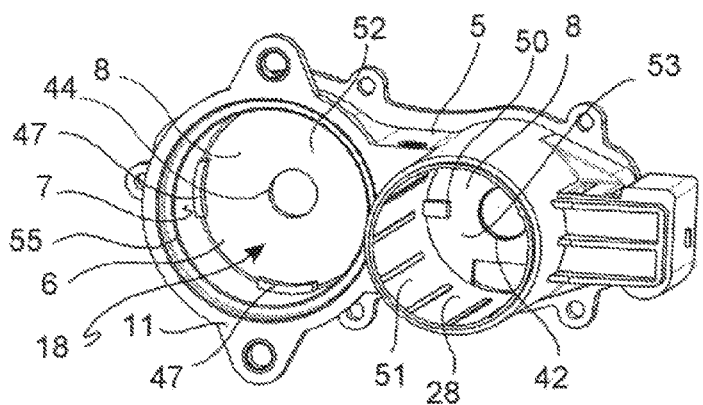
FIG. 14    FIG. 15

BRAKE GEAR MOTOR GROUP

FIELD OF THE INVENTION

This invention relates to a gear motor group.

In particular, this invention relates to a gear motor group for operating electromechanical disc brake callipers.

STATE OF THE ART

As known, in disc brake callipers opposing pads are pressed, thanks to the action of at least one piston, against opposite braking surfaces of a braking band of the associable disc brake.

This piston is usually accommodated in a cylinder formed in the body of the calliper and is energized by brake fluid pressurized by a brake pump, usually pedal operated.

There are also known brake callipers where the piston, or pistons, are energized electromechanically, for example by the rotation of a worm screw accommodated in the body of the piston and set in rotation by an electric motor, or more commonly, by a gear motor.

A solution of this type is disclosed in U.S. Pat. No. 7,021,415B2 of Stoneridge Control Devices, Inc. This document discloses a parking brake system, electrically operated by an actuator. The actuator comprises a motor having a motor shaft, and a gear train coupled to the motor shaft, wherein the gear includes at least one mechanical output from the actuator. The gear train includes a gear coupled to the motor shaft, a driven gear coupled to the drive gear, and a planetary gear group coupled to the driven wheel. This document describes configurations for insulating components of the actuator and controlling audible noise, wherein a support structure is coupled to a housing by means of insulators and insulators are provided to support the motor and gear train.

U.S. Pat. No. 6,736,233 of Stoneridge Control Devices, Inc. shows an essentially identical solution.

This solution, by focusing on the reduction of the noise produced by the operation of the gear motor, proposes a kinematic motor gear train that is elastically constrained to the support structure, a structure that, in turn, being inserted in the housing of the gear motor, is always moving, in fact, in preferred embodiments of this known solution, the support structure is elastically constrained to the housing.

If, on the one hand, these elastic constraints apparently reduce the noise of operation of the gear motor, on the other hand, they create play in the kinematic chain that is reflected in a significant loss of precision in the movement of the brake calliper, imprecision that becomes even more evident if the gear motor is operated repeatedly and directions of motion opposite to each other, for example to operate a service brake calliper, in addition to a parking brake calliper.

Therefore, there is a strongly felt need for a gear motor group for brake calliper, and a brake calliper, as well as a brake that, on the one hand are able to reduce the noise generated by the operation of the gear motor and, on the other hand, do not introduce play and, in any case, related movements between the various support structures of the kinematic train. At the same time, there is a strongly felt need for a solution that is easy to assemble and flexible, allowing its applications in braking systems of different power, avoiding the redesign of the whole group and especially the layout of the housing of the gear motor, which strongly influence the bulk of the braking system and the entire wheel-suspension assembly of the vehicle.

Solution

Therefore, the purpose of this invention is to propose a group that allows achieving the above-mentioned needs as well as solving the drawbacks of the prior art mentioned so far.

These and other purposes are achieved by a gear motor group according to claim 1 and by a brake calliper assembly according to claim 4, as well as by a brake according to claim 5.

Some advantageous embodiments are the object of the dependent claims.

FIGURES

Further characteristics and advantages of the group according to the invention will appear in the following description of its preferred embodiments, provided by way of non-limiting example, with reference to the accompanying figures, wherein:

FIG. 13 represents, in an axonometric view, a housing of a gear motor group;

FIGS. 14 and 15 show the housing of FIG. 13 according to two other points of view;

DESCRIPTION OF SEVERAL PREFERRED EMBODIMENTS

Figure 1:
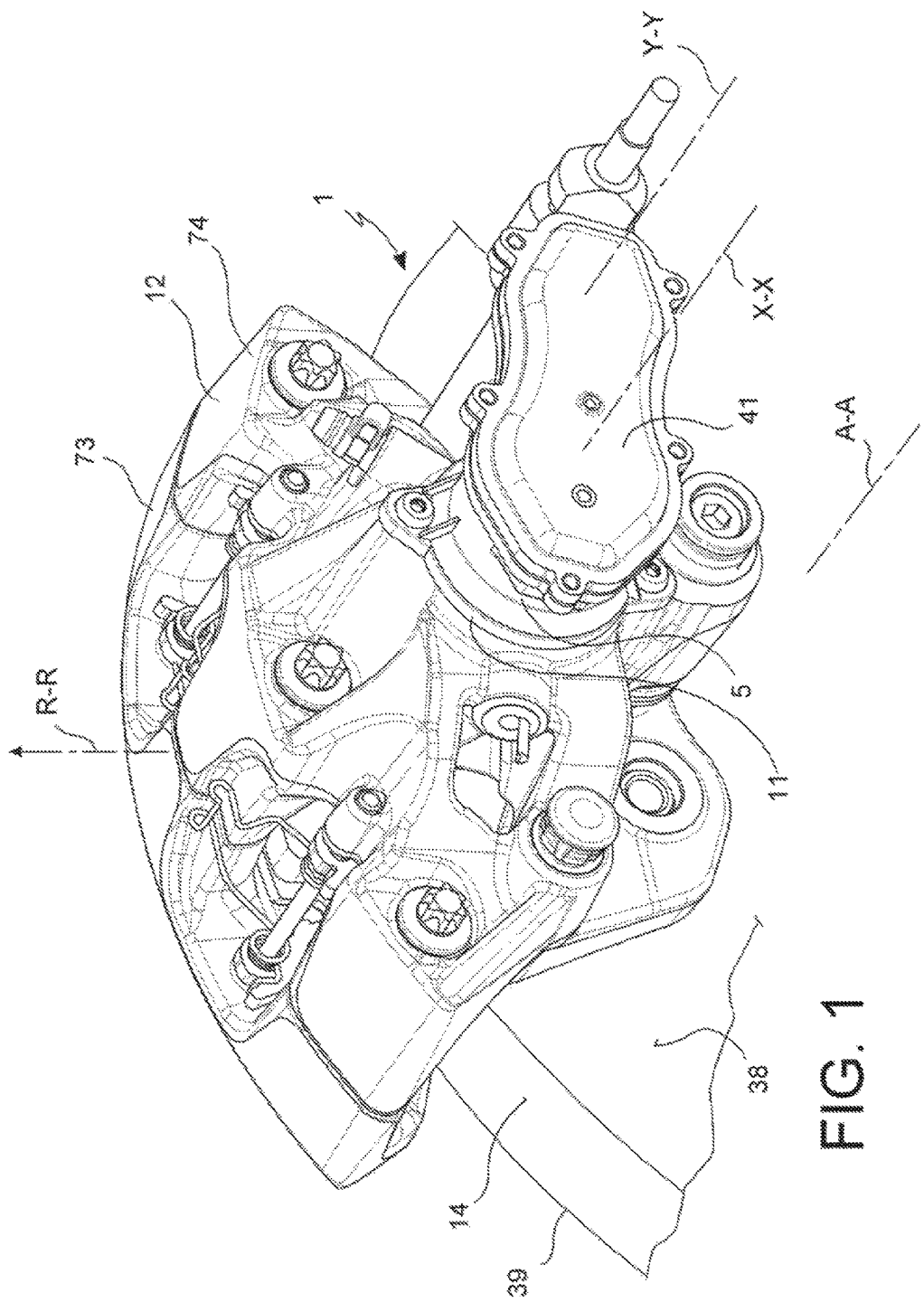
FIG. 1 represents, in an axonometric view, a disc brake comprising a gear motor group coupled to a calliper placed astride a brake disc, in accordance with a possible embodiment.
Figure 2:
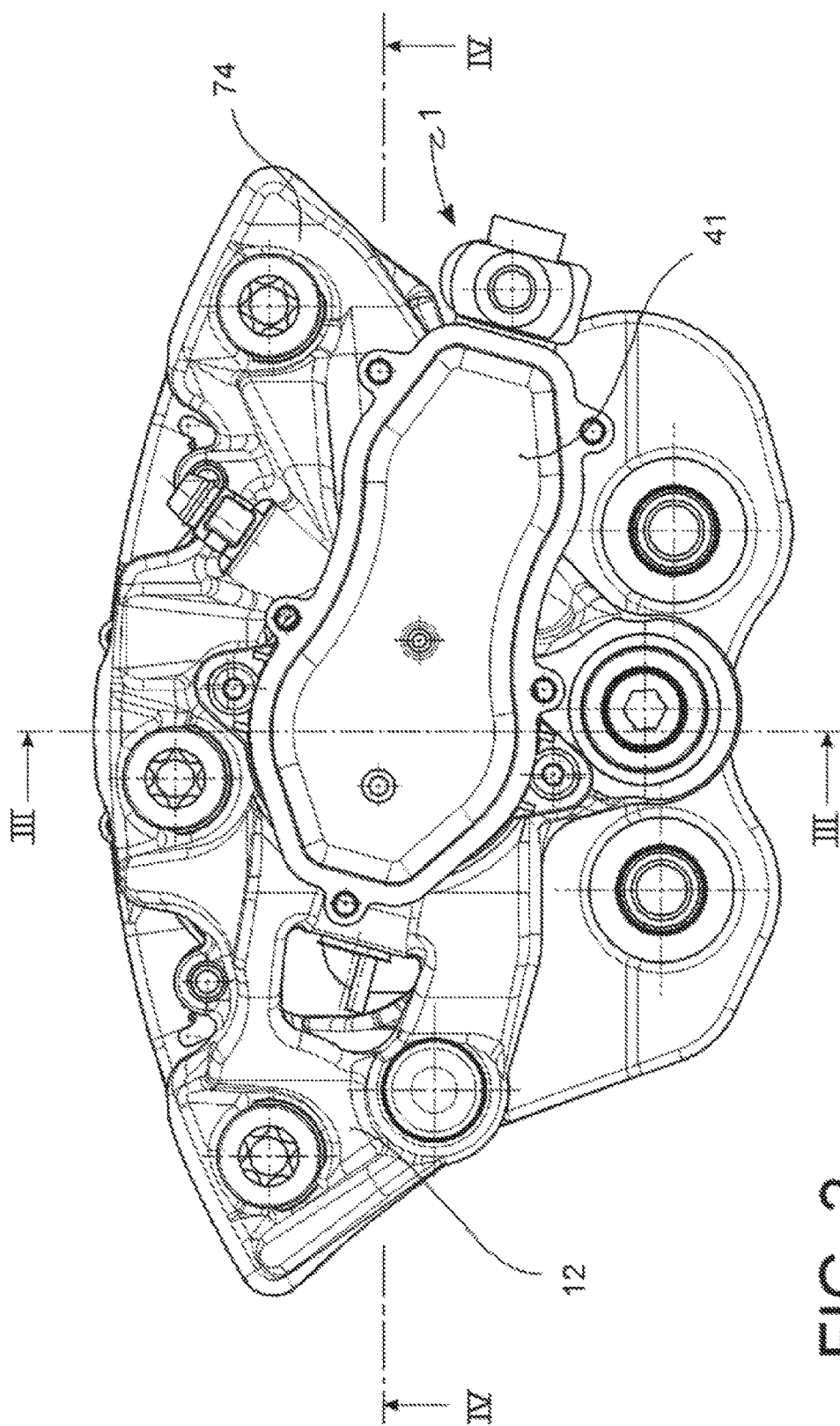
FIG. 2 represents a front view of the calliper-gear motor group of FIG. 1.
Figure 3:
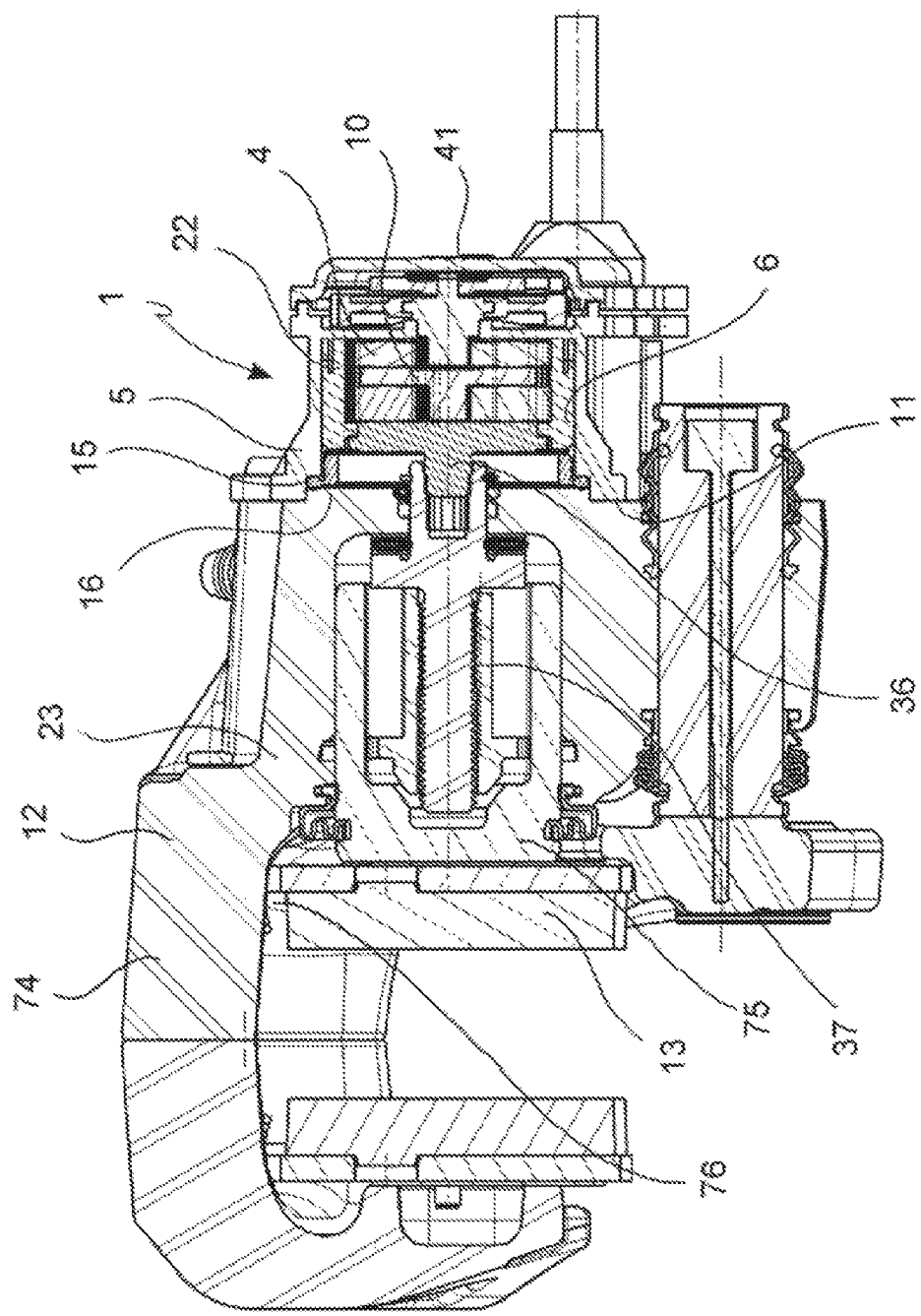
FIG. 3 represents a section along line of FIG. 2.
Figure 4:
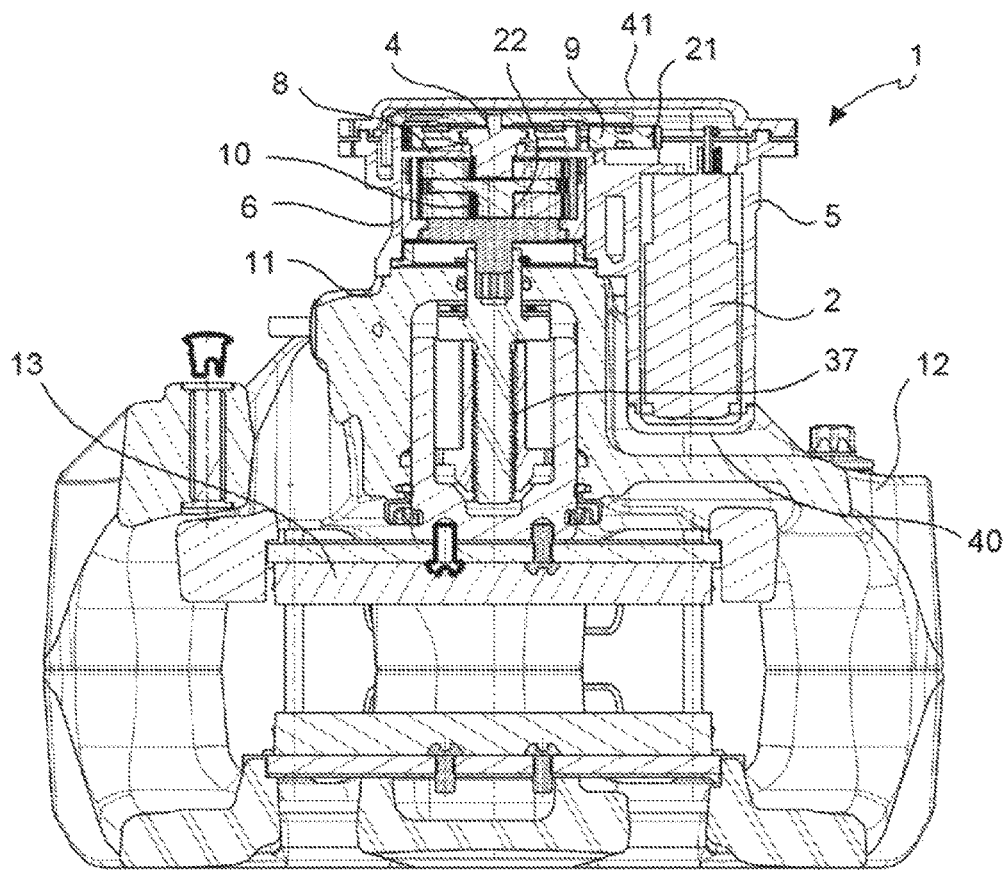
FIG. 4 shows a section along line IV-IV of FIG. 2.
Figure 5:
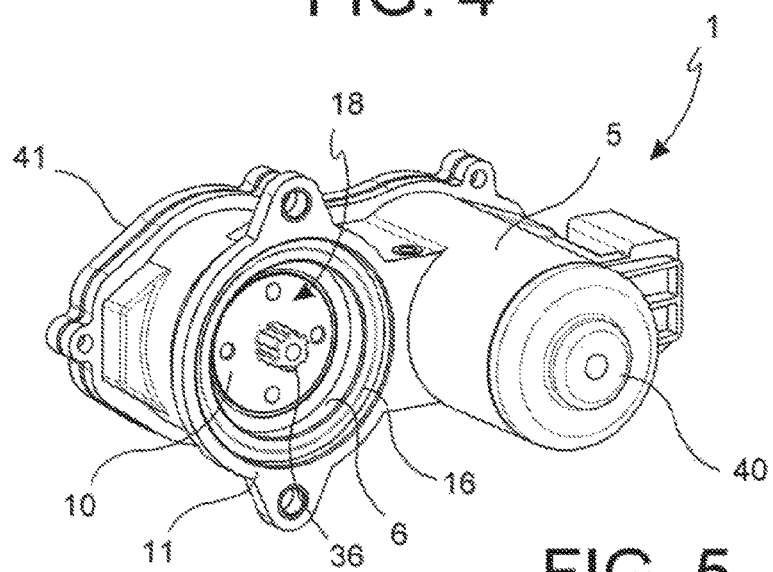
FIG. 5 represents, in an axonometric view, a gear motor group seen from the side of coupling to a calliper.
Figure 6:
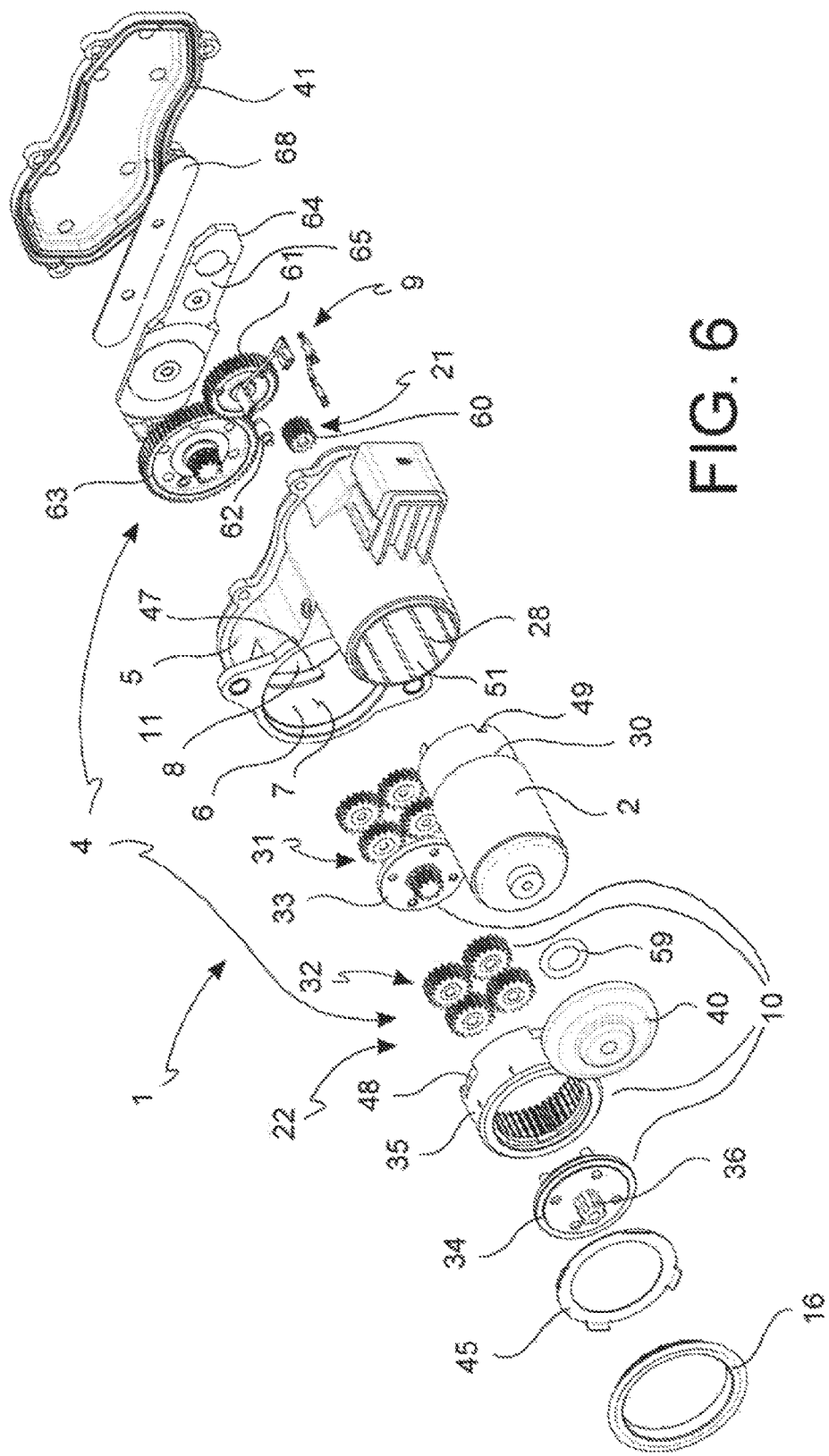
FIG. 6 represents, in an exploded axonometric view, a gear motor group according to an embodiment.
Figure 7:
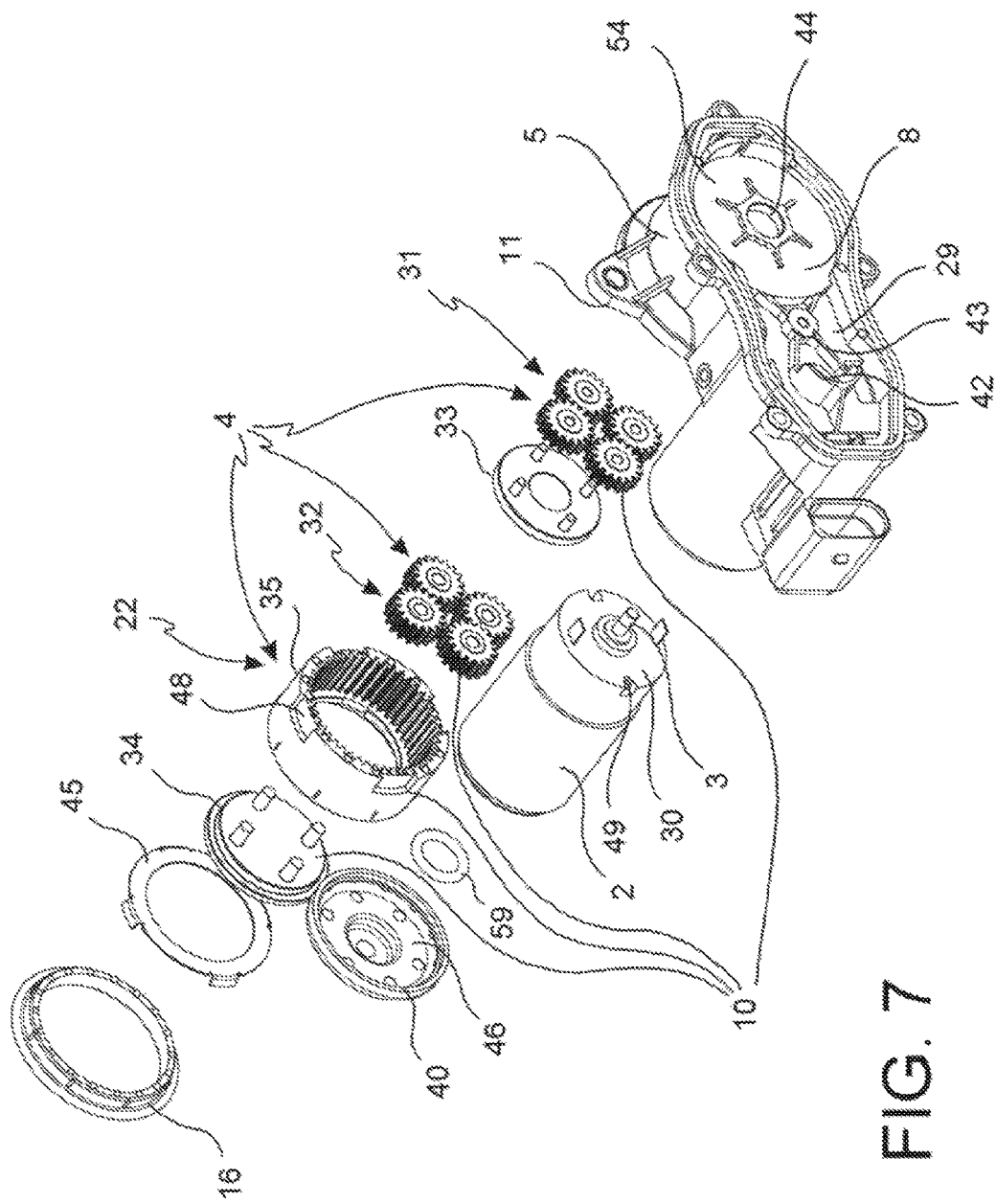
FIG. 7 represents, in an exploded axonometric view, a part of the components of the group of FIG. 6.
Figure 8:
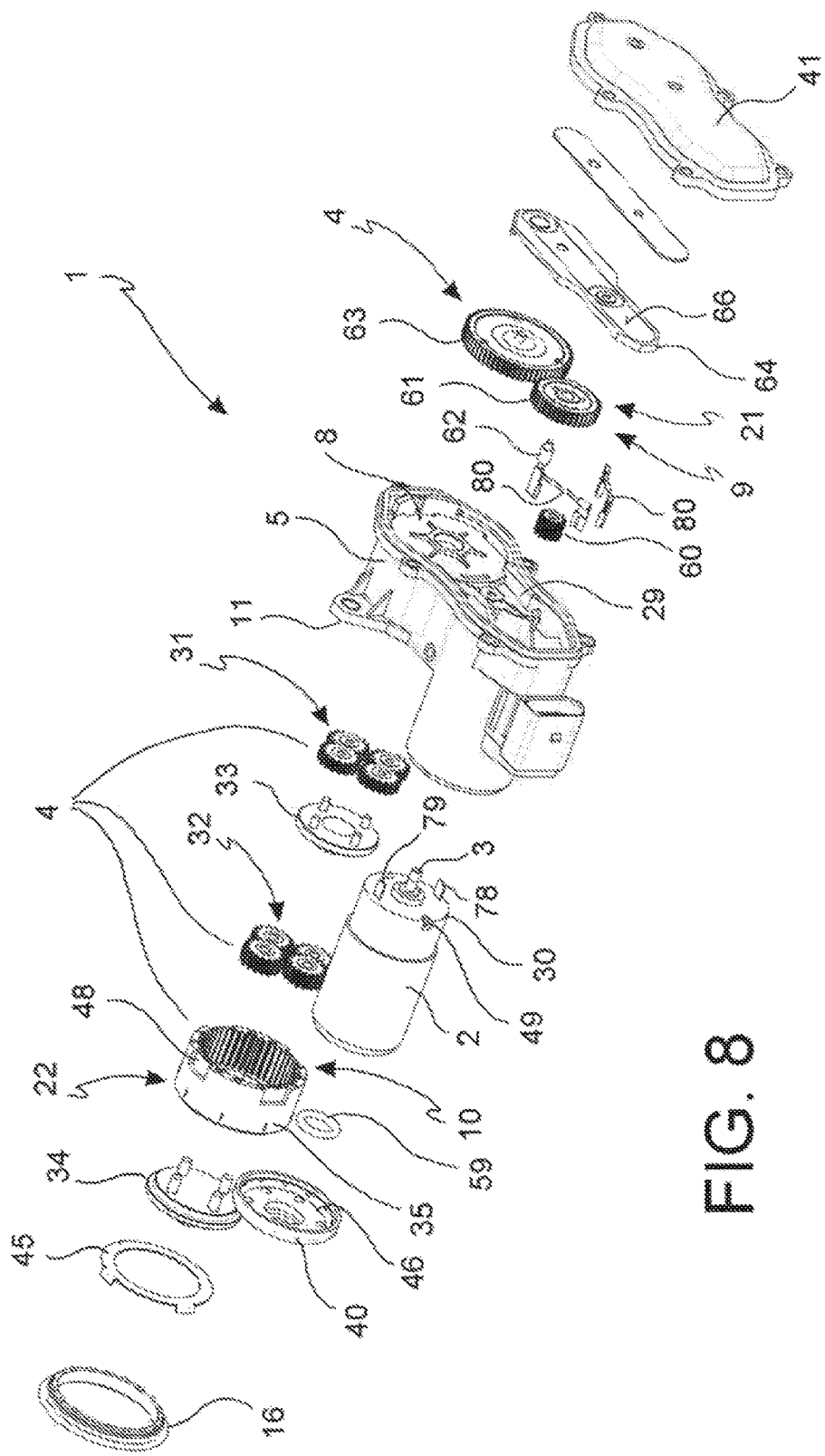
FIG. 8 represents, in an exploded axonometric view, the group of FIG. 6 according to an opposite point of view.
Figure 9:
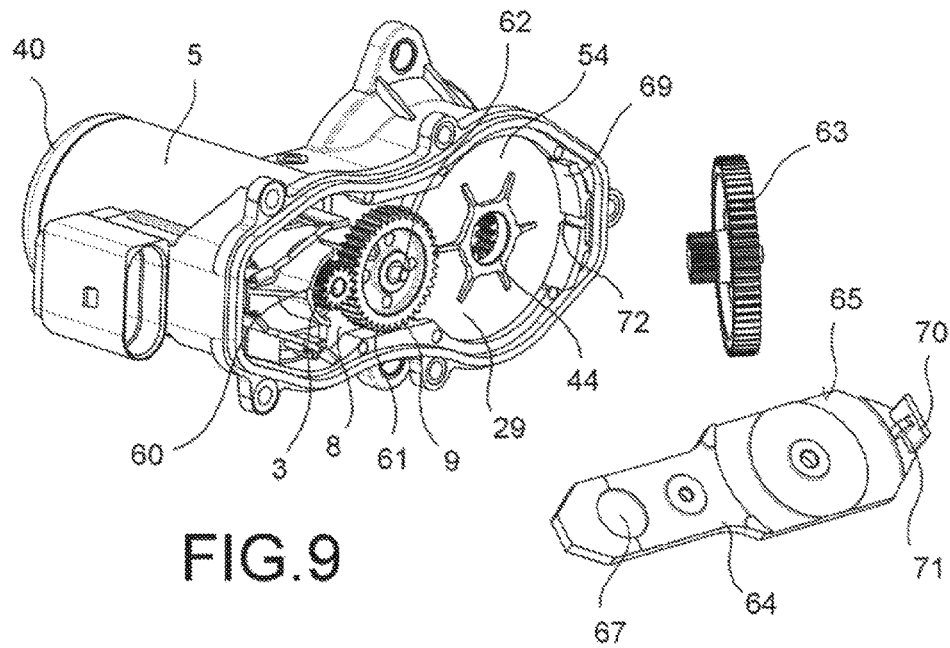
FIG. 9 represents a gear motor group from the side opposite to the side for coupling to a calliper, without cover and partially exploded, in an assembly step of the group.
Figure 10:
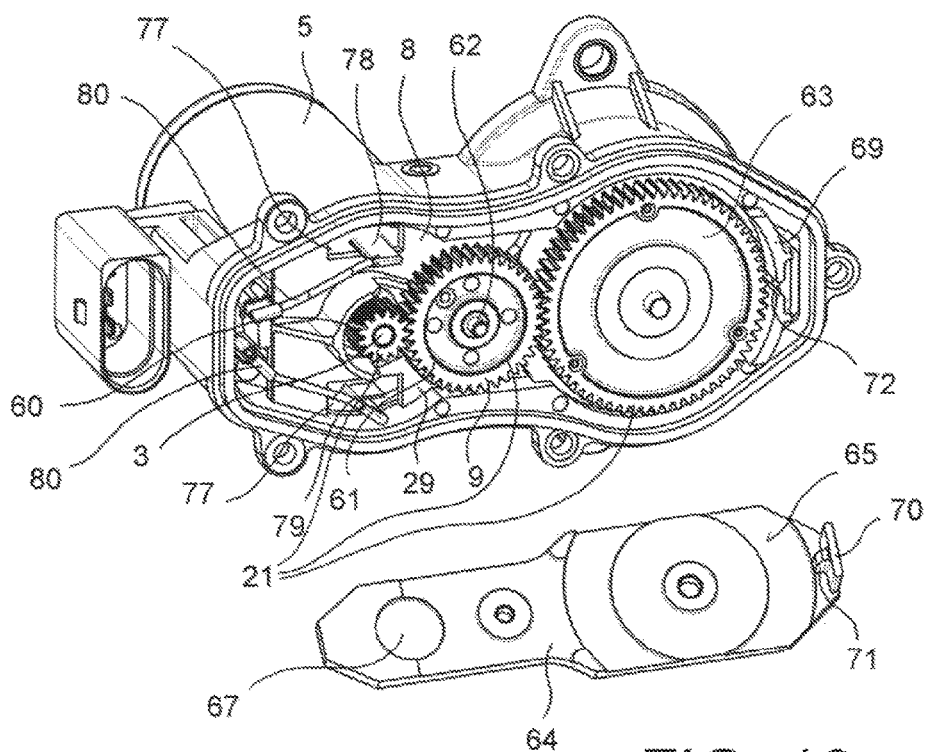
FIGS. 10, 11 and 12 represent the gear motor group of FIG. 9 in further assembly steps of the group.
Figure 11:
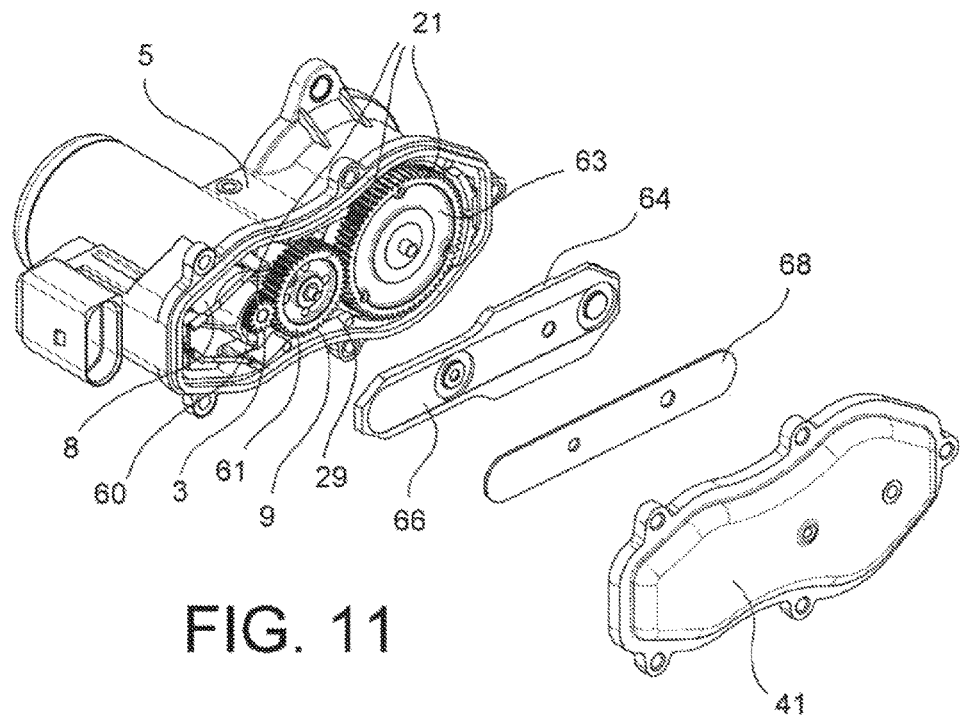
Figure 12:
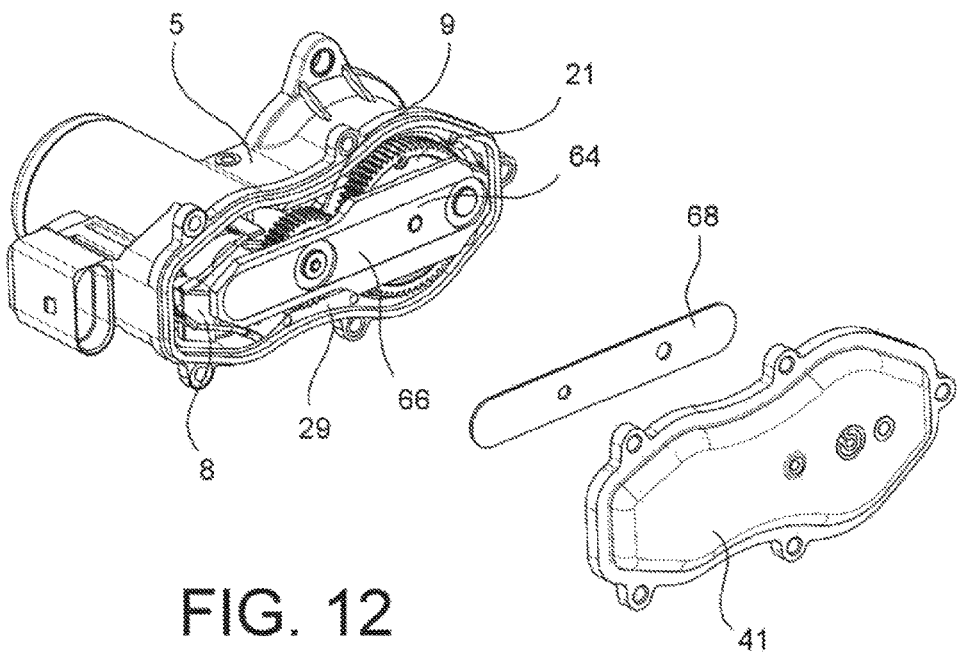
Figure 16:
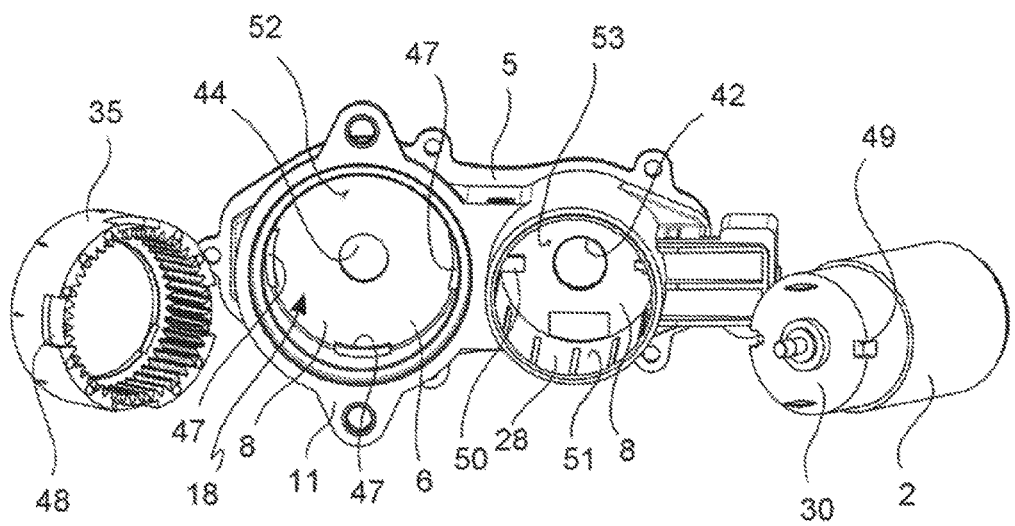
FIG. 16 shows, in an axonometric view, a gear motor housing with alongside a crown of a planetary gear and an electric motor in order to highlight the geometrical couplings between these components.
Figure 17:
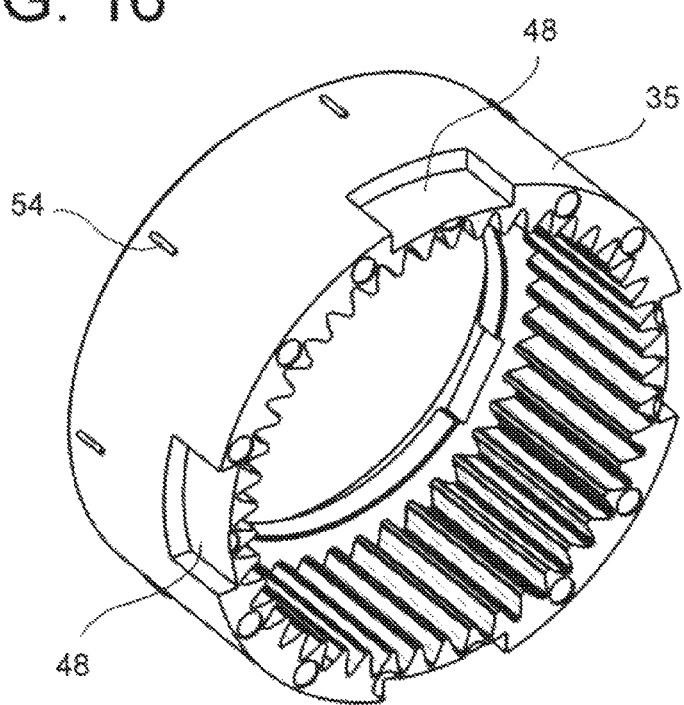
FIG. 17 shows, in an isometric view, of a crown of a planetary gear.
Figure 18:
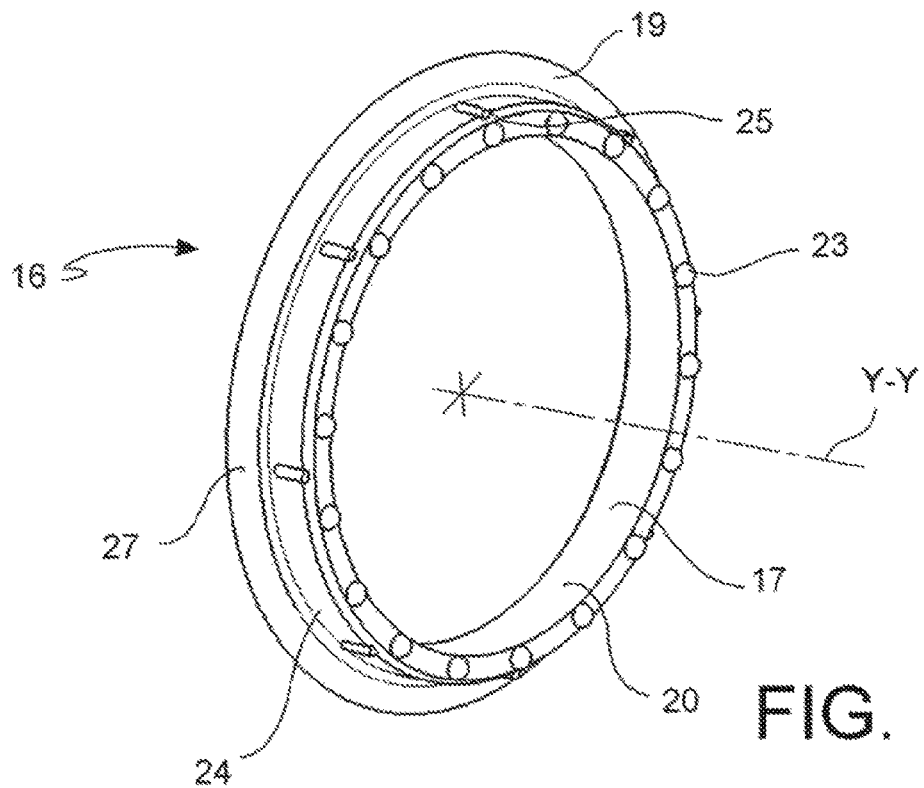
FIG. 18 represents, in an axonometric view, an embodiment of first elastic means.
Figure 19:
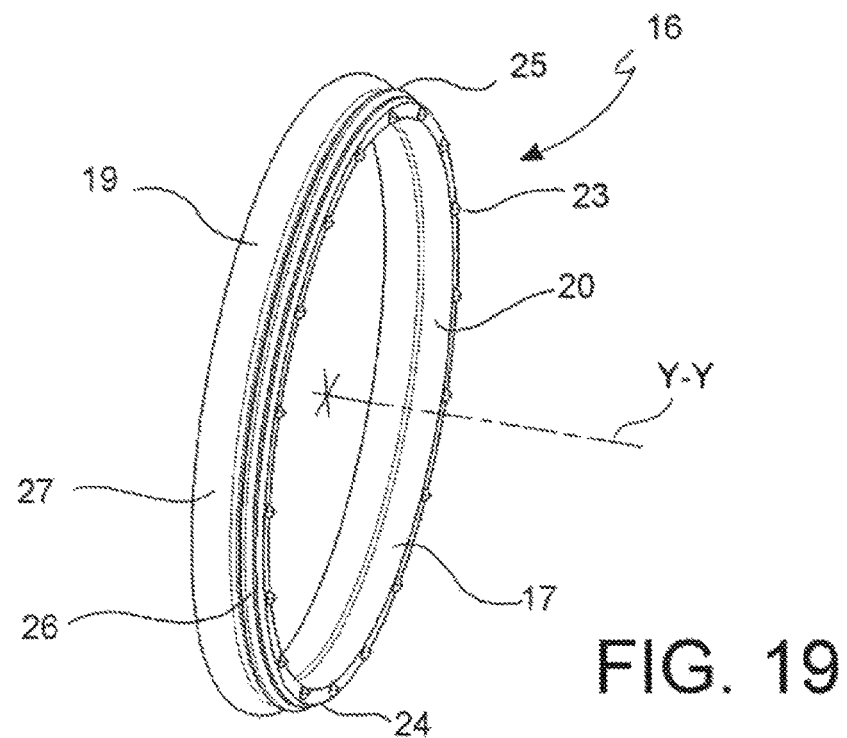
FIG. 19 represents, in an axonometric view, a further embodiment of first elastic means.
Figure 20:
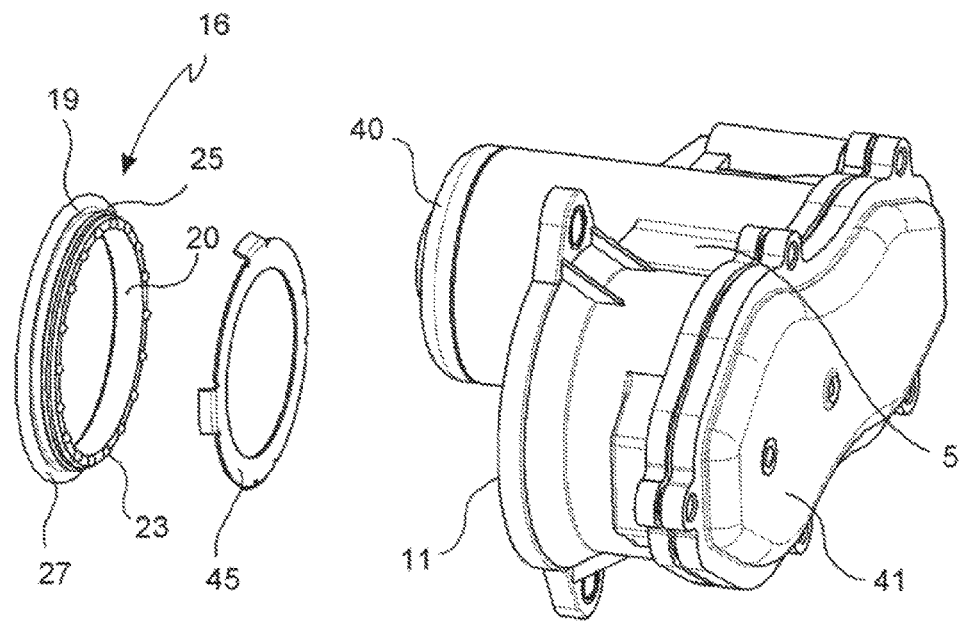
FIG. 20 illustrates, in an exploded axonometric view, an assembly step of a stop ring and first elastic means in a gear motor group.
Figure 21:
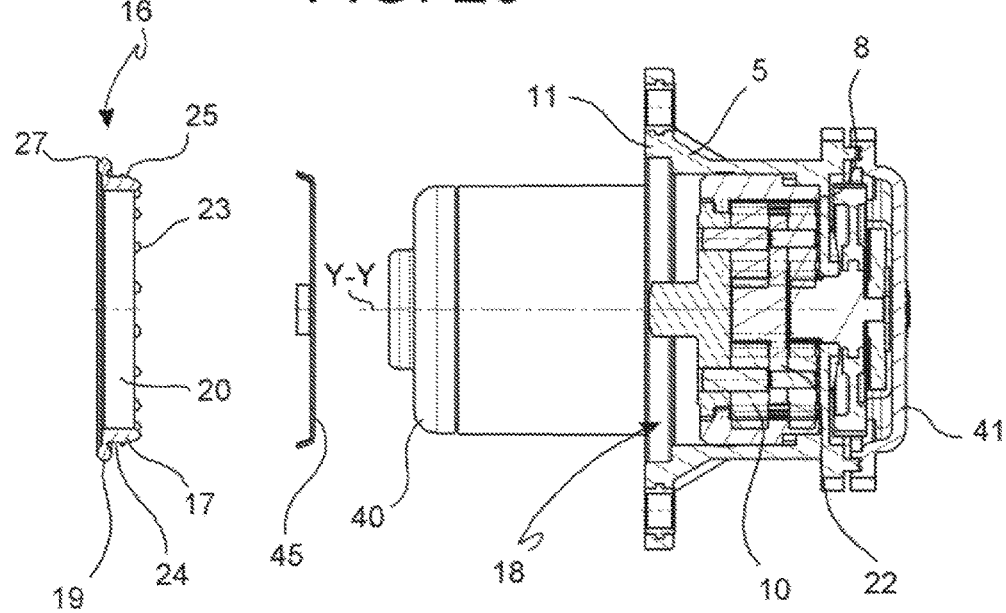
FIG. 21 represents, in a partially-sectioned lateral view, the assembly step of FIG. 20.
Figure 22:
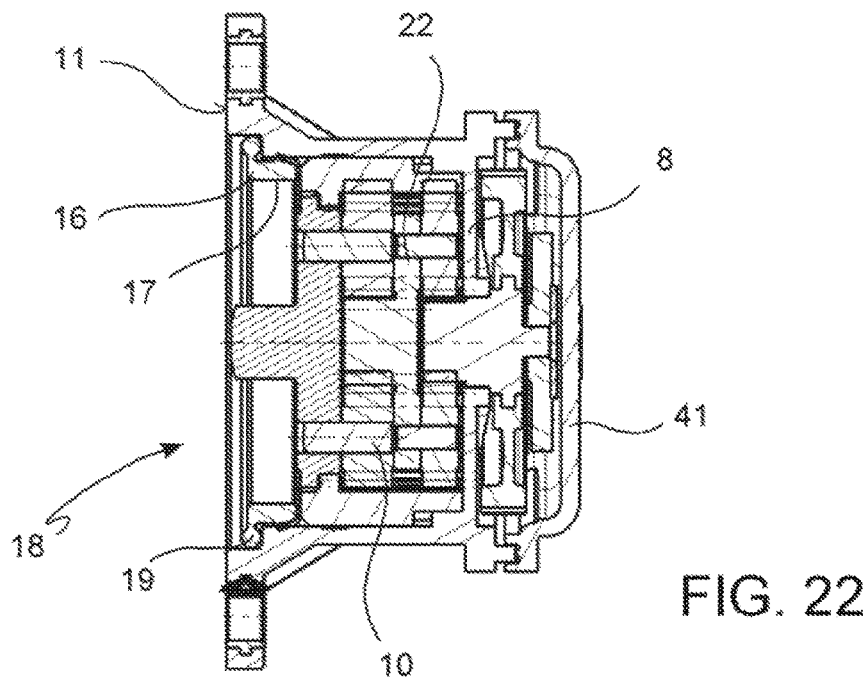
FIG. 22 shows a detail in section of the gear motor group of FIGS. 20 and 21 and the end of assembly.
Figure 23:
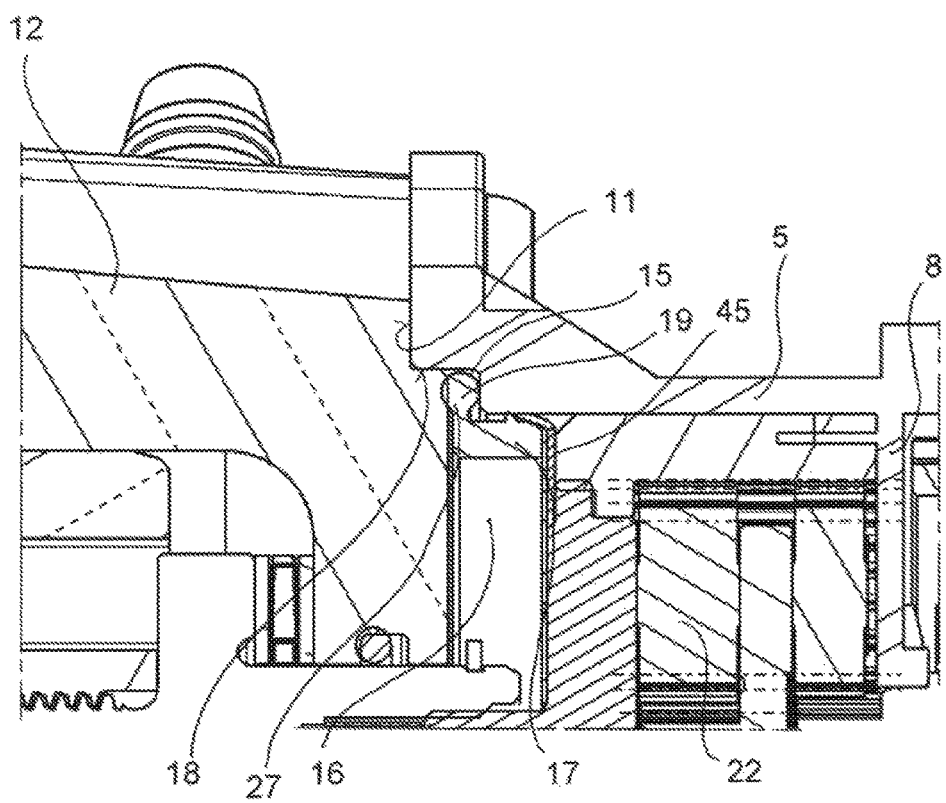
FIG. 23 shows, in section, a detail of the coupling zone between a gear motor group and a calliper when coupled together, according to an embodiment.
Figure 24:
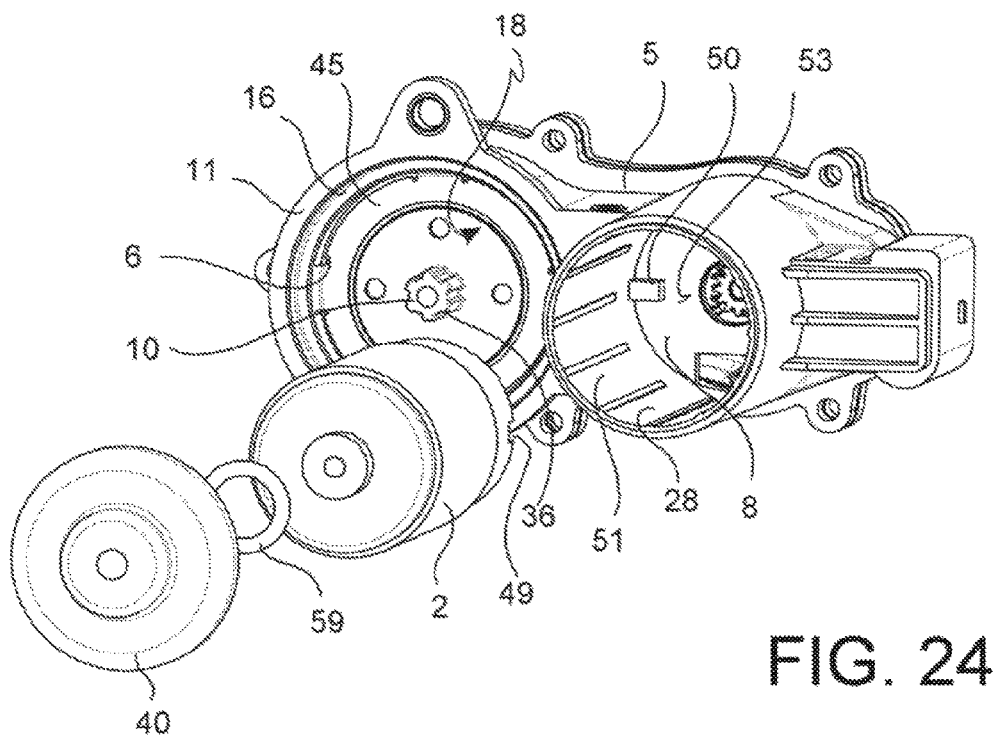
FIG. 24 illustrates, in a partially-exploded axonometric view, a gear motor group in a further step of assembly of the electric motor.
Figure 25:
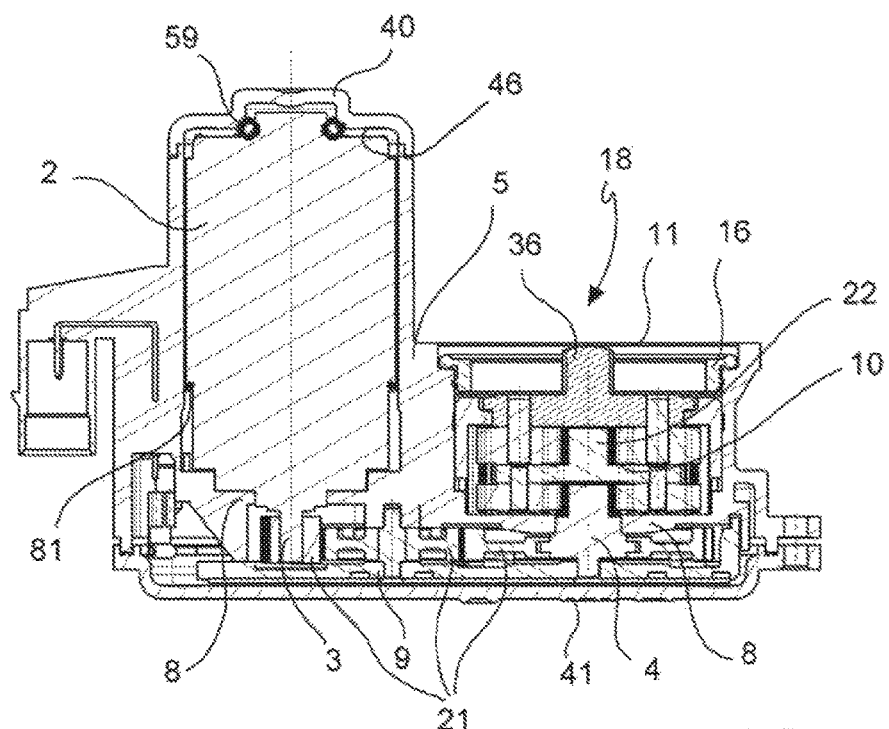
FIG. 25 shows, in section, the group of FIG. 24 at the end of the assembly phase.
Figure 26:
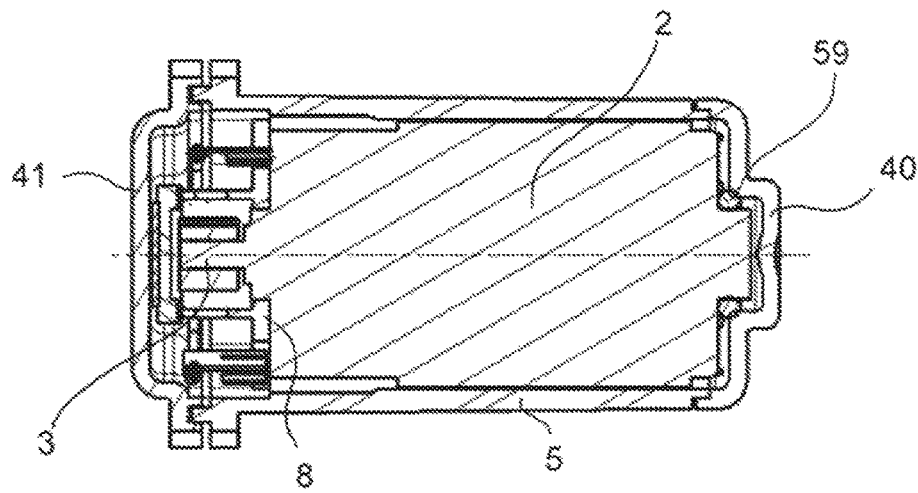
FIG. 26 represents, in a section orthogonal to the preceding, a detail of the group of FIG. 25.
Figures 27, 28:
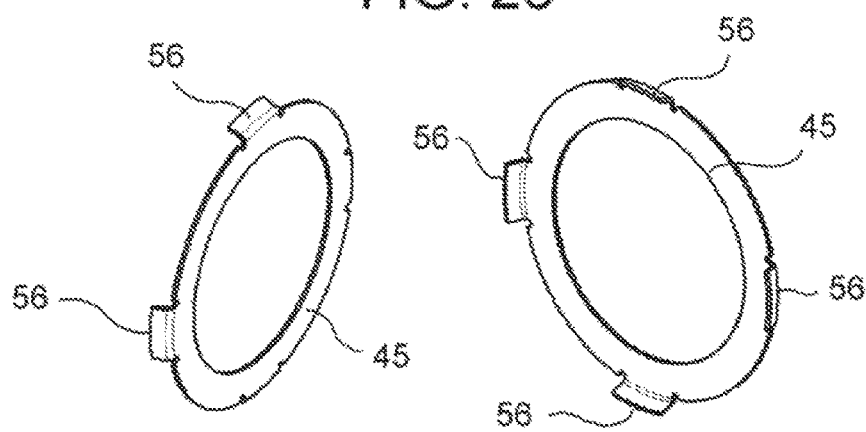
FIGS. 27 and 28 represent, in an axonometric view, according to two different points of view, a stop ring according to an embodiment.
Figure 29:
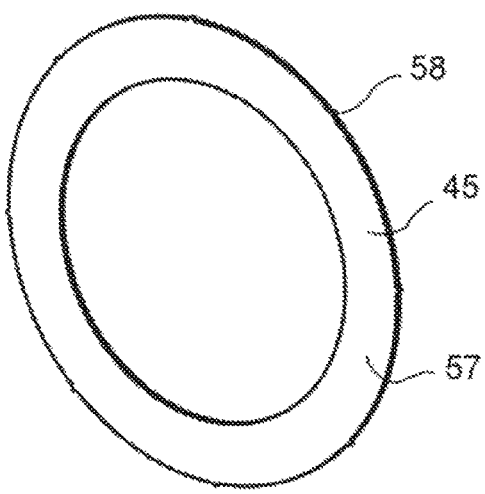
FIG. 29 shows, in an axonometric view, a further embodiment of a stop ring.
Figure 30:
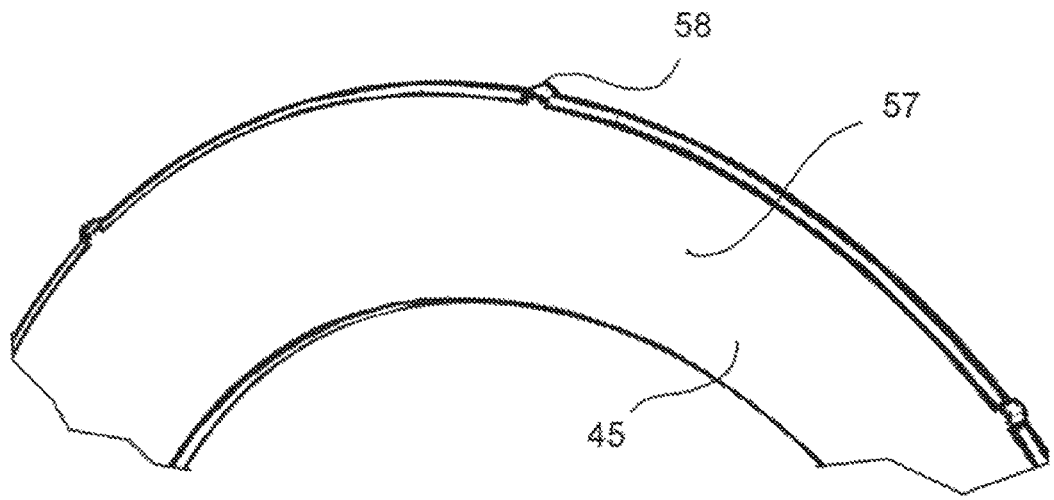
FIG. 30 represents an enlargement of FIG. 29 that allows highlighting a detail of the outer edge of the stop ring.
Figure 31:
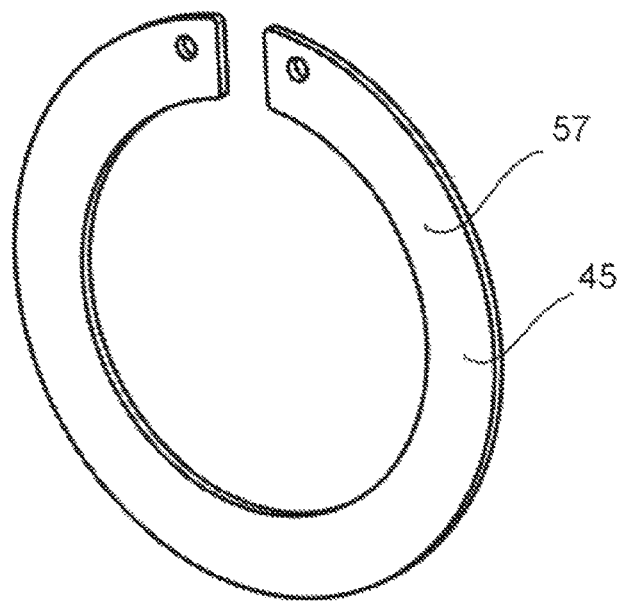
FIG. 31 illustrates, in an axonometric view, yet another embodiment of a stop ring.

With reference to the above-mentioned figures and in accordance with a general embodiment, a brake gear motor group 1 comprises an electric motor 2 having a motor shaft 3.

Said group, further comprises a gearbox or reducer 4 is operatively connected, with its input side 9, for example with first gears of its input side, to said motor shaft 3, to receive a movement and a driving torque and transmit them with its side output 10, for example with second gears of its output side, to the brake, for example to the thrust means of a brake calliper.

Said group also comprises a housing 5 having at least one chamber 6,28,29.

Said at least one chamber 6,28,29 is at least partly delimited by at least one chamber wall or mantle 7.

A support plate 8 is provided in said housing.

Said motor 2, preferably electric, is accommodated, at least in part, in said at least one chamber 28.

Said motor shaft 3 is supported freely rotatable in said support plate 8.

Said reducer 4 is accommodated in said at least one chamber 6,29.

Said reducer 4 is supported freely rotatable in said support plate 8.

Said housing 5 comprises a connection rim to the brake 11 suitable to couple said housing 5 to a brake calliper 12 so as to interface with said output side 10 of the reducer 4 to the brake and allow the movement of at least one brake pad 13 towards and away from a disc brake disc 14 and exert a braking action.

Said connection rim 11 defines a connection aperture of the group to the brake 18.

Said connection rim 11 comprises an annular retention seat 15.

In accordance with an embodiment, said group comprises first elastic means 16.

Said first elastic means 16 comprise a first portion of elastic means 17 accommodated in said at least one chamber 6, substantially astride said connection aperture 18, interposed between said reducer 4 and the brake calliper 12.

Said first elastic means 16 comprise a second portion of elastic means 19 accommodated in said annular retention seat 15 and interposed between said housing 5 and said brake calliper 12.

In accordance with an embodiment, said motor 2 defines a first axial direction X-X and said reducer 4, at its reducer output side 10, defines a second axial direction Y-Y.

In accordance with an embodiment, said first axial direction X-X is parallel to said second axial direction Y-Y, and for example, they are parallel to the axis of rotation of the brake disc A-A.

In accordance with an embodiment, said support plate 8 is connected to said housing 5 so as to delimit at least two chambers 6,28,29 open along said axial directions X-X and Y-Y from opposite sides of the housing 5.

In accordance with an embodiment, said support plate 8 is connected to said housing 5 so as to delimit three chambers 6,28,29, two of which open, or that face in the same axial direction X-X or Y-Y, and one that faces in the opposite direction.

In accordance with an embodiment, two of said three chambers 28,29 are closed by covers, a first cover 40 and a second cover 41, while the third chamber 6 is suitable to connect through a connection aperture of the group to the brake 18 to a brake calliper 12

In accordance with an embodiment, said reducer 4 comprises a cascade or train of gears 21 that connects said motor shaft 3 to a planetary gear reducer 22.

In accordance with an embodiment, said planetary gear reducer 22 extends along an axis parallel to, or coincident with, said second axial direction Y-Y.

In accordance with an embodiment, said first portion of elastic means 17 and said second portion of the elastic means 19 are in one piece.

In accordance with an embodiment, said first elastic means 16 are made of elastomer.

In accordance with an embodiment, said first portion of elastic means 17 and said second portion of elastic means 19 are made of different materials. For example, said first portion of elastic means 17 and said second portion of elastic means 19 are in one piece, obtained by co-extrusion of two different materials.

In accordance with an embodiment, said first portion of elastic means 17 and said second portion of elastic means 19 are made of different materials, wherein the first portion 17 is made of a material suitable to dampen the vibrations induced by the gear motor (for example EPDM Ethylene-Propylene Diene Monomer or similar), and said second portion 19 is made of a material suitable to ensure the seal between the housing 5 and the brake calliper 12 (for example an elastomer or a rubber).

In accordance with an embodiment, said first portion of elastic means 17 comprises a damper able to dampen the vibrations of the brake gear motor group.

In accordance with an embodiment, said first portion of elastic means 17 comprises a damper able to dampen the vibrations of the brake gear motor group 1, having a vibration frequency higher than a predefined frequency limit (for example 900 Hz).

In accordance with an embodiment, said first portion of elastic means 17 comprises a means to reduce the noise coming from the gear motor group 1 and, in particular, the reducer 4.

In accordance with an embodiment, said first portion of elastic means 17 comprises an annular first elastic means body portion 20 from which project axial protuberances 23, substantially directed along said second axial direction Y-Y.

In accordance with an embodiment, said axial protuberances are a plurality of axial protuberances 23, for example, distributed equally spaced along the annular extension of the first portion of elastic means 20 and facing the reducer 4, for example the planetary gear 22.

In accordance with an embodiment, said axial protuberances 23 have the form of semi-spherical caps, in order to make gradual the increase of the contact area to the facing component during their crushing.

In accordance with an embodiment, the plurality of axial protuberances 23 is of a pre-defined number and proportional to the intensity of the elastic/damping characteristic desired.

In accordance with an embodiment, said first portion of elastic means 17 comprises an external surface of first elastic means body portion 24 suitable to face the surface, wall or mantle 7 that delimits said at least one chamber 6.

In accordance with an embodiment, radial projections of first portion of elastic means 25 are provided projecting radially from said first portion of the elastic means 17.

In accordance with an embodiment, said radial projections are a radial ring 26.

In accordance with an embodiment, said radial projections of first portion of elastic means 25 have maximum radial dimension capable of interfering with said connection aperture of the group to the brake 18 and/or with said at least one chamber wall or mantle 7, so as to allow a pre-assembly of the first elastic means 16 in said housing 5 and preventing their accidental fall during the operations of production, assembly or maintenance of the group 1.

In accordance with an embodiment, said first portion of elastic means 17 comprises a first elastic means body portion 20 of annular shape and substantially rectangular or square cross-section.

In accordance with an embodiment, the second portion of elastic means 19 extends radially to form an annular body of second portion of elastic means 27.

In accordance with an embodiment, said annular body of second portion elastic means 27 has a substantially circular cross section, for example in the form of an O-ring.

In accordance with an embodiment, said support plate 8 is in one piece with said housing 5.

In accordance with an embodiment, said support plate 8 comprises a first support plate surface 52, facing said output side 10 of reducer 4, and a second support plate surface 53, facing said electric motor 2. Said support plate 8 comprises a third support plate surface 54 facing said reducer input 9 side of said reducer 4.

In accordance with an embodiment, said housing 5 is divided by said support plate into three chambers 6,28,29.

A first chamber 6 of said three chambers houses at least the output side 10 of the reducer 4.

In accordance with an embodiment, said first chamber 6 houses at least a planetary gear 22.

In accordance with an embodiment, said planetary gear 22 includes two pluralities of satellites 31,32, a first plurality of satellites 31 being supported by a first satellite-holder stage 33 that, on the opposite side, meshes with the second plurality of satellites 32, supported in turn by a second satellite-holder stage 34.

In accordance with an embodiment, said second satellite-holder stage has a coupling mesh 36 for coupling to the movement mechanism of a brake calliper actuator 37, suitable to influence at least one brake pad 13 in abutment against a braking surface 38 of a disk brake disc 14.

In accordance with an embodiment, said satellites are accommodated in a toothed crown 35 that is keyed in said at least one chamber, for example said first chamber 6.

In accordance with an embodiment, said toothed crown 35 has radial crown prominences 54 suitable to interfere with the chamber wall or mantle 7 delimiting said first chamber 6, so as to keep said toothed crown 35 in position during the assembly or pre-assembly step of the gear motor group 1.

In accordance with an embodiment, said reducer 4 is accommodated in said at least one chamber 6 by geometrically coupling its reducer seats 48 with the radial prominences of the reducer 47 provided in the chamber wall or mantle 7 that delimits at least one chamber 6, to discharge onto these prominences 47, and then on the housing 5, the torsion actions and/or axial actions on the reducer 4.

In accordance with an embodiment, said electric motor 2 is accommodated in said at least one chamber 28 by geometrically coupling its motor seats 49 with the radial motor prominences 50 provided in the wall or mantle 51 that delimits said at least one chamber 28, to discharge onto these prominences 50, and then on the housing 5, the torsion actions and/or axial actions in the motor 2.

In accordance with one embodiment, between said motor seats 49 and said radial motor prominences 50 are provided fourth elastic means 81 suitable to dampen the vibrations of the gear motor.

In accordance with an embodiment, said output side 10 of the reducer 4 is locked axially Y-Y, or from coming out of the housing 5, by a stop ring 45.

Said stop ring 45 is constrained to said at least one chamber wall or mantle 7, so that said output side of the reducer 10 is closed between said support plate 8 and said stop ring 45.

In accordance with an embodiment, said stop ring 45 pack-closes said output side 10 of the reducer 4 against said support plate 8, or, in accordance with an embodiment, against the radial crown prominences 54 provided in said housing 5.

In accordance with an embodiment, said stop ring 45 is made of plastic (for example PBT GF 30 or Polybutylene terephthalate).

In accordance with an embodiment, said stop ring 45 is made of metal, for example, spring steel.

In accordance with an embodiment, said stop ring 45 is inserted in a radial stop ring seat 55 provided in said chamber wall or mantle 7 of said chamber or first chamber 6.

In accordance with an embodiment, said stop ring 45 comprises radial stop ring teeth 56 that protrude radially so as to clamp the chamber wall or mantle 7 of the said chamber or first chamber 6.

In accordance with one embodiment, said radial stop ring teeth 56 are folded back towards the connection aperture of the group to the brake 18 so as to stick against said chamber wall or mantle 7 if pressed in extraction by said chamber or first chamber 6, in the manner of grappling hooks.

In accordance with one embodiment, a stop ring comprises an annular portion 82 drawn and folded towards the connection aperture of the brake assembly 18 so as to stick against said chamber wall or mantle 7 if pressed in extraction by said chamber or first chamber 6, in the manner of a single annular grappling hook.

In accordance with an embodiment, said stop ring 45 comprises a flat plate ring body 57.

In accordance with an embodiment, said stop ring 45 of the flat blade ring body 57 comprises ring body radial prominences 58 suitable to stick in the wall or mantle 7 of said chamber or first chamber 6, or in the walls of said radial stop ring seat 55.

In accordance with an embodiment, said stop ring 45 of flat plate ring body 57 is a Seeger® ring.

In accordance with an embodiment, said stop ring 45 is suitable to support an axial thrust of said output side 10 of the reducer 4, such as a planetary gear 22.

In accordance with an embodiment, said reducer 4 is accommodated in said at least one chamber 6 by geometrically coupling its reducer seats 48 with the radial prominences of the reducer 47 provided in the chamber wall or mantle 7 that delimits at least one chamber 6, to discharge onto these prominences 47, and then on the housing 5, any torsion actions and/or axial actions on the reducer 4.

In accordance with an embodiment, a second chamber 28 houses at least partially said electric motor 2.

In accordance with an embodiment, said second chamber housing the active end of the motor 30 of the electric motor 2, for example the end from which the motor shaft 3 protrudes.

In accordance with an embodiment, said support plate 8 comprises a first bearing of support and free rotation on the support plate for the motor shaft 42.

In accordance with an embodiment, said support plate 8 comprises a pair of seats for electrical contacts 77, suitable to receive electrical contacts of the motor 78,79 to which are connected gear motor wiring braids 80 to the power supply and control system of the vehicle.

In accordance with an embodiment, said electric motor 2 is accommodated in said at least one chamber 28, for example said second chamber 28, by geometrically coupling its motor seats 49 with the radial motor prominences 50 provided in the wall or mantle 51 that delimits said at least one chamber 28, to discharge onto these prominences 50, and then on the housing 5, the torsion actions and/or axial actions on the motor 2.

In accordance with an embodiment, said support plate 8 divides said housing into three chambers 6,28,29, a first chamber 6 accommodates the output side 10 of the reducer 4, a second chamber houses at least a part of the electric motor 2 and a third chamber 29 houses the input side 9 of the reducer 4, or the side of the reducer connected to the electric motor 2. Said second chamber 28 is closed by a first cover 40 substantially cup-shaped, selected from a set of cup-shaped covers, that forms a first cover compartment 46 of a predefined size and suitable for housing a portion of a specific size of electric motor 2, in order to adapt said brake gear motor group 1 to different applications, by changing only said first cover 40 in said of first covers, and keeping the housing 5 unchanged to obtain gear motor assemblies of different powers.

In accordance with an embodiment, said first cover 40, connecting to the housing 5, pack-clamps the electric motor 2 against the radial motor prominences 50 provided in the wall or shell 51 that delimits at least one chamber 28. In accordance with a further embodiment, said first cover 40, connecting to the housing 5, pack-clamps the electric motor 2 against said support plate 8.

In accordance with an embodiment, between said first cover 40 and said electric motor are interposed second elastic means 59, suitable to dampen the vibrations and reduce the noise produced by operation of the gear motor group 1.

Figure 35:
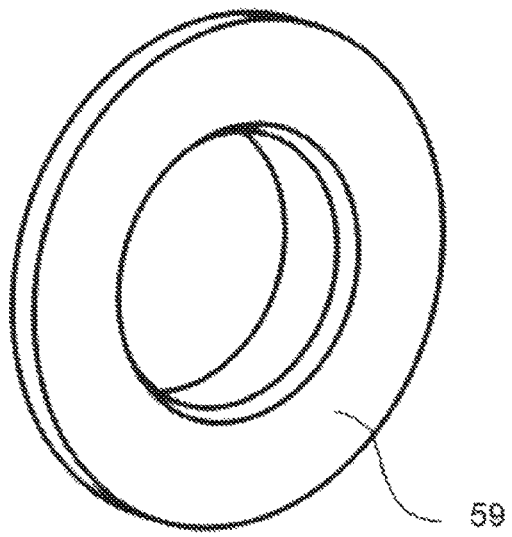
FIGS. 35 and 36 represent, in an axonometric view, according to two different points of view, elastic means according to a further embodiment.
Figure 36:
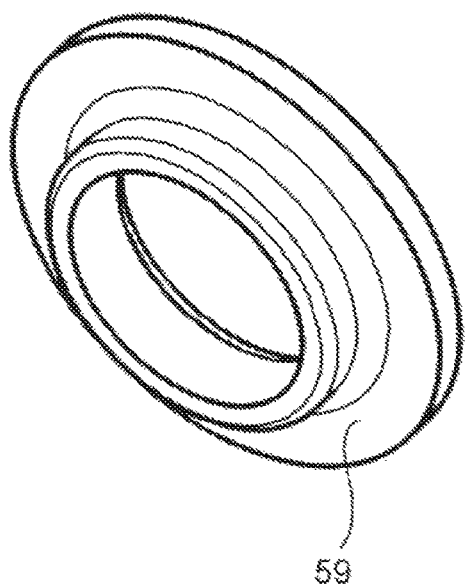
Figure 37:
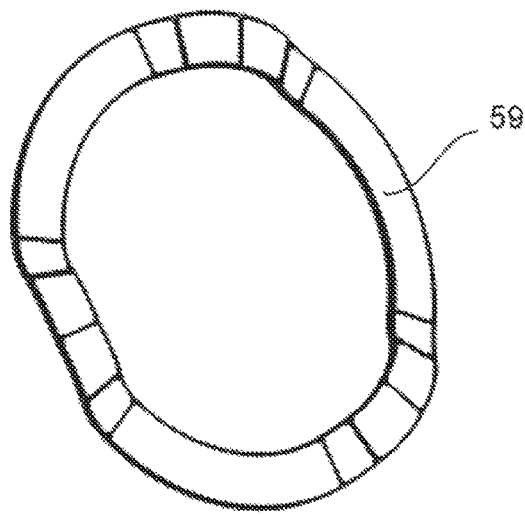
FIG. 37 shows, in an axonometric view, elastic means according to a further embodiment.

In accordance with an embodiment, said second elastic means are an O-ring 59, or, in accordance with a further embodiment, a shaped elastic ring 83 or a wave spring 84 (FIGS. 35, 36 and 37).

In accordance with an embodiment, said second elastic means 59 are made of vibration and/or noise-damping (for example EPDM).

In accordance with an embodiment, said housing 5 delimits a third chamber 29 that houses said input side 9 of the reducer 4.

In accordance with an embodiment, said third chamber 29 houses at least one gear cascade 21.

In accordance with an embodiment, said motor shaft 3 is supported by said support plate 8 and protrudes with one of its ends from the opposite side with respect to the electric motor 2, projecting in said third chamber 29 to connect operatively to the input side 9 of the reducer 4.

In accordance with an embodiment, the input side 9 of the reducer 4 comprises a cascade or train of gears 21.

In accordance with an embodiment, said gear cascade 21 comprises a pinion 60 keyed on said motor shaft 3.

In accordance with an embodiment, said second gear cascade 21 comprises a non-motorised wheel 61 that engages said pinion 60.

In accordance with an embodiment, said non-motorised wheel 61 is keyed onto a non-motorised wheel pin 62 supported by said support plate 8.

In accordance with an embodiment, said gear cascade 21 comprises a secondary toothed wheel 63 meshed with said non-motorised wheel 62 and centrally supporting a toothed coupling pinion gear meshed with the output side of the reducer 10, for example, passing through an aperture of the support plate 8.

In accordance with an embodiment, said gear cascade 21 comprises gears 60,61,63 arranged side by side, allowing positioning the motor axis X-X parallel to the axis Y-Y of the output side 10 of the reducer 4, making the gear motor group 1 compact.

In accordance with a different embodiment, said secondary toothed wheel and said toothed coupling pinion are keyed on a secondary wheel pin 85.

In accordance with an embodiment, said group 1 comprises a thrust plate 64 connected to said support plate 8 forming an abutment for the reducer 4, for example, the input side of the reducer 9, for example a gear cascade 21.

In accordance with an embodiment, said thrust plate 64 comprises one or more first thrust plate surfaces 65 facing said reducer 4.

In accordance with an embodiment, said thrust plate 64 comprises one or more second thrust plate surfaces 66 on the side opposite said reducer 4.

In accordance with an embodiment, said thrust plate 64 includes a groove or lowering of the thrust plate 67, which receives, without entering into contact, the motor shaft 3 and the pinion 60, avoiding interfering with the pinion 60 and/or motor shaft 3 and avoiding influencing, with an axial reaction, the motor 2 and interfering with the action of the second elastic means 59.

In accordance with an embodiment, said third chamber 29 is closed by a second cover 41, for example to protect said gear cascade 21.

In accordance with an embodiment, between said thrust plate 64 and said second cover 41 are interposed third elastic means 68.

In accordance with an embodiment, said third elastic means 68 are made of a material suitable to dampen the vibrations of the gear motor 1 and reduce noise during its operation.

In accordance with an embodiment, the support plate 8 comprises a first bearing of support and free rotation for the motor shaft 42, said bearing is realized by avoiding the interposition of elastic or damping means in order to avoid sagging in the kinematic chain that would reduce the readiness of response of the gear motor group 1.

In accordance with an embodiment, the support plate 8 comprises a bearing for non-motorised wheel 43, or second pin support and free rotation bearing, said non-motorised wheel bearing is realized on the support plate avoiding the interposition of elastic or damping means in order to avoid sagging in the kinematic chain that would reduce the readiness of response of the gear motor group 1.

In accordance with an embodiment, the support plate 8 comprises a bearing for secondary wheel 44, or third secondary wheel support and free rotation bearing 44, said secondary wheel bearing is realized on the support plate avoiding the interposition of elastic or damping means in order to avoid sagging in the kinematic chain that would reduce the readiness of response of the gear motor group 1.

In accordance with an embodiment, said reducer 4 comprises gears 21,22.

In accordance with an embodiment, said gears 21 and straight-tooth gears.

Figure 32:
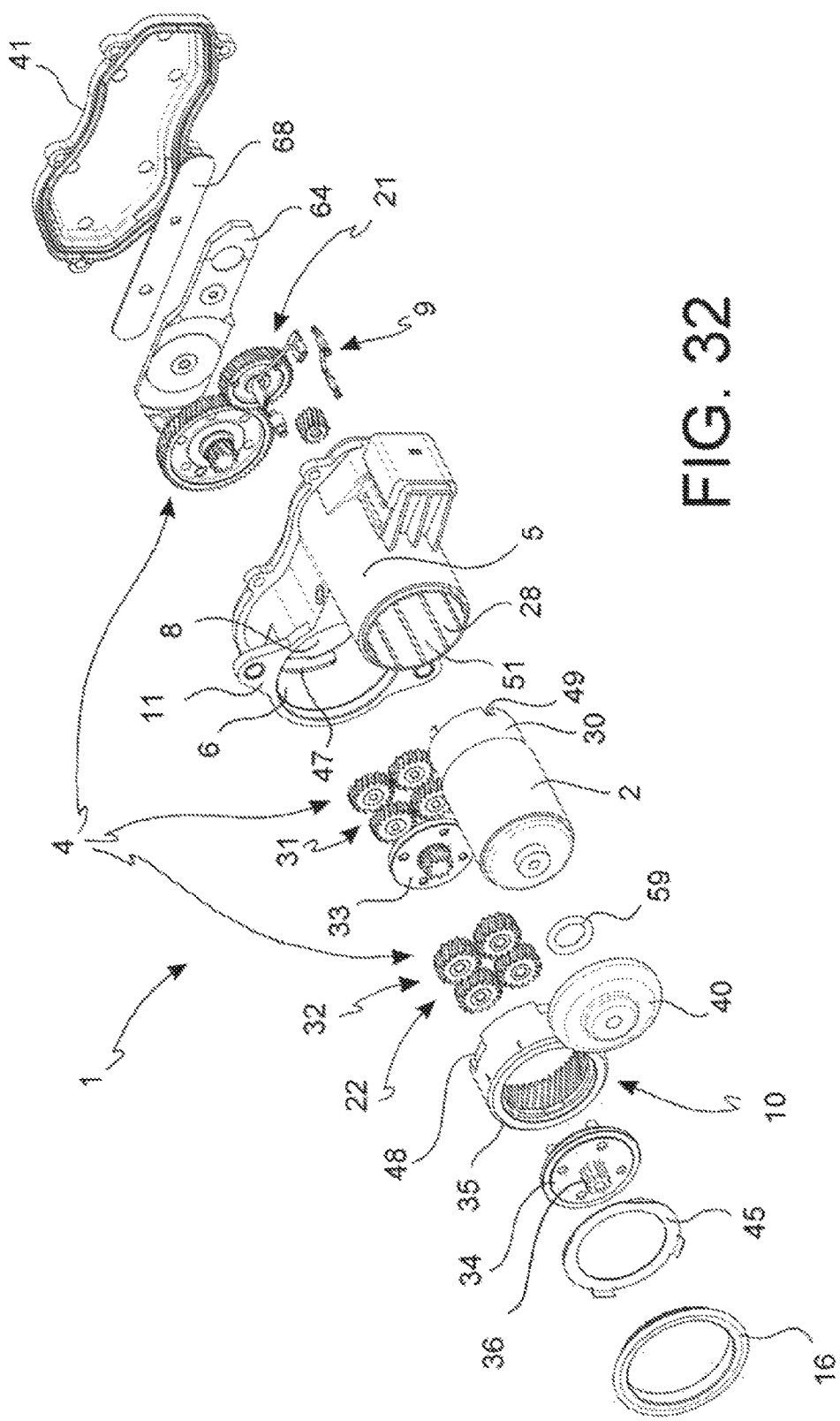
FIG. 32 shows, in an exploded axonometric view, a gear motor group according to yet another an embodiment.
Figure 33:
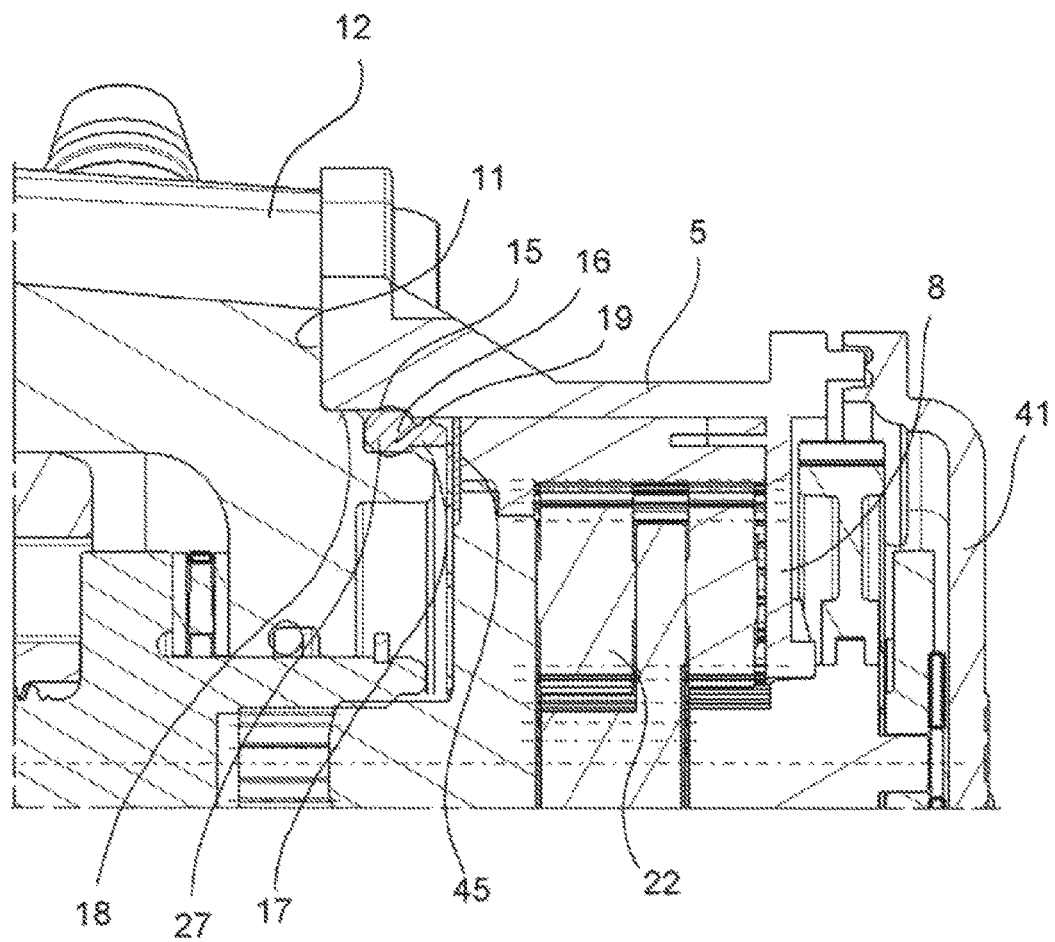
FIG. 33 shows a detail, in section, of a gear motor group coupled to a calliper according to yet another embodiment.
Figure 34:
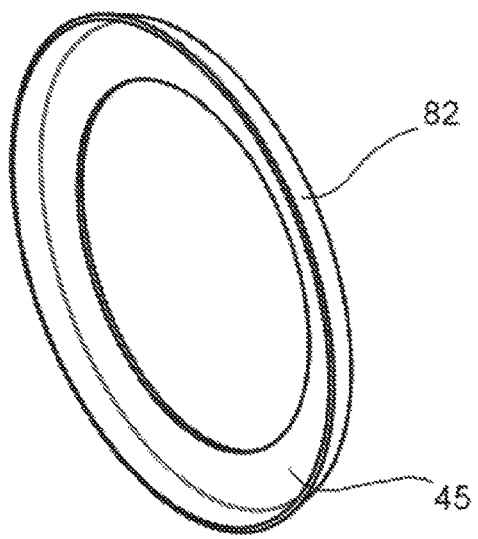
FIG. 34 represents, in an axonometric view, a stop ring according to a further embodiment.

In accordance with an embodiment, said gears 21,22 are helical-toothed gears in order to make the gear motor even more ready and allowing a greater and continuous grip between the gears of the reducer, reducing meshing vibration and noise (FIG. 32).

In accordance with an embodiment, the motor 2 is supported, and its rotation contrasted, by a shape coupling with radial prominences 50 provided in the wall or mantle 51 of the second chamber 28, in which said prominences are accommodated with geometrical coupling in radial seats 49 provided in the motor 2.

In accordance with an embodiment, said prominences 50 allow supporting the motor 2 also in the axial direction X-X, avoiding directly loading the support plate 8.

In accordance with an embodiment, said housing 5 is made of synthetic material, while the radial motor support prominences 50 are implemented with metal inserts set in the body of the housing, for example by co-moulding.

In accordance with an embodiment, the reducer output side gear 10, for example a planetary gear 22, is supported, and its rotation contrasted by the shape coupling with radial reducer prominences 47 provided in the wall or mantle 7 of the first chamber 6, in which said prominences 47 are accommodated with geometric coupling in radial seats 48 provided in the output side 10 of the reducer 4, for example a planetary gear 22.

In accordance with an embodiment, said prominences 47 allow supporting the output side 10 of the reducer 4 also in the axial direction Y-Y, avoiding directly loading the support plate 8.

In accordance with an embodiment, said housing 5 is made of synthetic material and the reducer output side radial support prominences 47 are metal inserts set in the body of the housing, for example by co-moulding.

In accordance with an embodiment, said support plate 8 comprises reinforcement ribs 69 that allow lightening the group 1 while, at the same time, avoid weakening it.

In accordance with an embodiment, said support plate 8 includes ribs 70 for supporting the thrust plate 64 on the support plate 8 while avoiding axially loading the motor 2 and/or reducer 4 and creating a space for the free rotation of the gear cascade 21.

In accordance with an embodiment, said support plate 8 comprises an angular centring rib 71 that is geometrically coupled with a septum 72 of the thrust plate 64.

In accordance with an embodiment, said non-motorised wheel 61 is keyed onto a pin 62 supported by a first end of the support plate 8 and by the thrust plate 64 on the other end.

In accordance with an embodiment, said pin 62 also performs the function of centring pin of the thrust plate 64 on the support plate 8.

In accordance with an embodiment, said pin 62 is co-moulded with the support plate 8.

Figure 38:
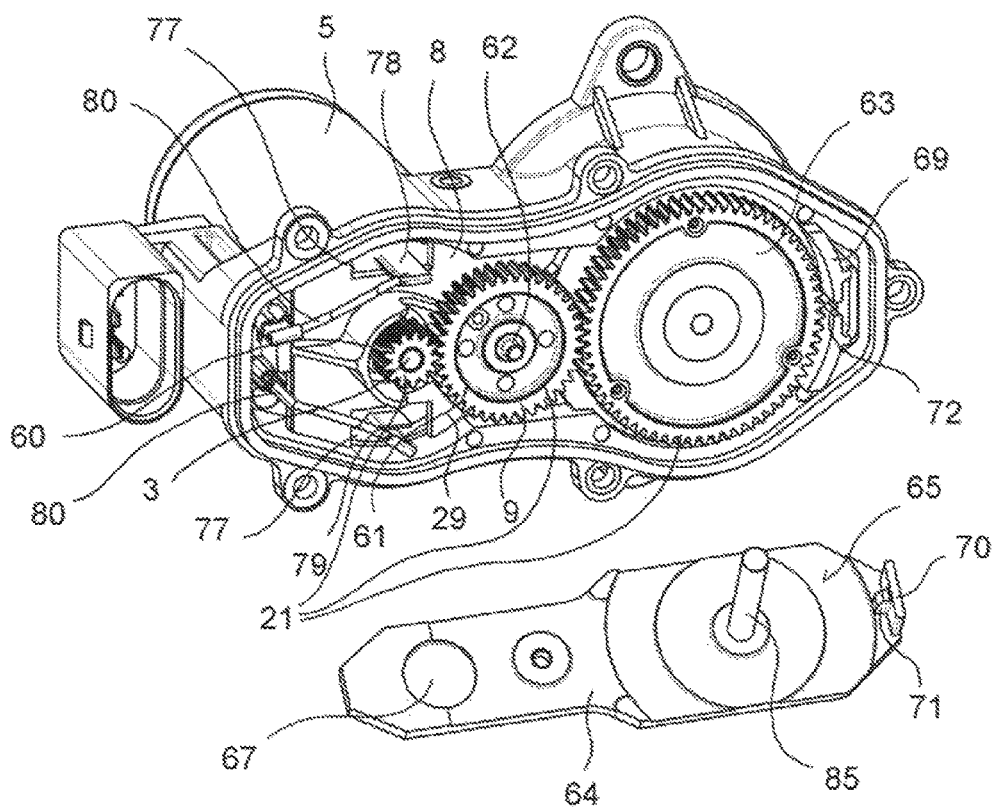
FIG. 38 represents the gear motor assembly similar to that of FIG. 9 in an assembly step and according to yet another embodiment.

In accordance with a different embodiment, said secondary toothed wheel 63 and said toothed coupling pinion are keyed on a secondary wheel pin 85 made as a single piece or co-moulded with said thrust plate (FIG. 38).

In accordance with a general embodiment, a disc brake calliper 12, comprises a calliper body 73 suitable to be placed astride a brake disc 14. Said brake disc (14) comprises a first braking surface 38 and a second braking surface 39.

Said calliper body 73 also comprises a first vehicle side portion 74, suitable to face said first braking surface 38 of the brake disk 14, which comprises thrust means 75 housed in it, i.e., a device suitable to influence at least one pad in abutment on a braking surface of the disc.

In accordance with an embodiment, said first vehicle side portion 74 comprises at least a first seat 76 suitable to receive at least a first pad 13, suitable to face and be placed substantially parallel to said first braking surface 38.

In accordance with an embodiment, said at least a first pad 13 is slidingly accommodated in said at least one first seat 76 so as to be positioned between said first vehicle side portion 74 and said first braking surface 38 to abut against said first braking surface 38 and exert a braking action on the brake disc 14 when influenced by the thrust means 75.

In accordance with an embodiment, the calliper comprises a gear motor group according to one of the embodiments described above, wherein said group is operatively connected to said thrust means 75.

In accordance with a general embodiment, a disc brake comprising a brake disc 14 on which a calliper is placed astride according to one of the embodiments described above, wherein, for example but not necessarily, said brake is a parking brake.

In accordance with a general embodiment, a disc brake comprising a brake disc 14 on which a calliper is placed astride according to one of the embodiments described above, wherein, for example but not necessarily, said brake is a service brake.

In accordance with a general embodiment, a brake gear motor group 1 comprises
 an electric motor 2 having a motor shaft 3;
 a reducer 4 operatively connected, with its input side 9, to said motor shaft 3, to receive a movement and a driving torque and transmit them with its side output 10 to the brake;
 a housing 5 having at least one chamber 6,28,29;
 said at least one chamber 6,28,29 being at least partly delimited by at least one chamber wall or mantle 7.

In accordance with a general embodiment, a support plate 8 is provided in said housing.

In accordance with a general embodiment, said motor 2 is accommodated, at least in part, in said at least one chamber 28 and said drive shaft 3 is supported freely rotatable in said support plate 8.

In accordance with a general embodiment, said reducer 4 is accommodated in said at least one chamber 6,29.

In accordance with a general embodiment, said reducer 4 is supported freely rotatable in said support plate 8.

In accordance with a general embodiment, said housing 5 comprises a connection rim to the brake 11 suitable to couple said housing 5 to a brake calliper 12 so as to interface said output side 10 to the brake and allow the movement of at least one brake pad 13 towards and away from a disc brake disc 14 and exert a braking action.

In accordance with a general embodiment, said support plate 8 is in one piece, or a single piece, with said housing 5, and said support plate 8 divides said housing in three chambers 6,28,29,
 a first chamber 6 accommodates the output side 10 of the reducer 4,
 a second chamber 28 houses said electric motor 2,
 a third chamber houses the input side 9 of the reducer 4 that receives the movement and driving torque from the electric motor 2, and
 said support plate 8 comprises support and free rotation bearings 42,43,44 for the motor shaft 3 and gears 21,22 of the reducer 4.

In accordance with yet another different general embodiment, a brake gear motor group 1 comprises:
 an electric motor 2 having a motor shaft 3;
 a reducer 4 operatively connected, with its input side 9, to said motor shaft 3, to receive a movement and a driving torque and transmit them with its side output 10 to the brake;
 a housing 5 having at least one chamber 6,28,29;
 said at least one chamber 6,28,29 being at least partly delimited by at least one chamber wall or mantle 7.

In accordance with a general embodiment, a support plate 8 is provided in said housing.

In accordance with a general embodiment, said motor 2 is accommodated, at least in part, in said at least one chamber 28 and said drive shaft 3 is supported freely rotatable in said support plate 8.

In accordance with a general embodiment, said reducer 4 is accommodated in said at least one chamber 6,29.

In accordance with a general embodiment, said reducer 4 is supported freely rotatable in said support plate 8.

In accordance with a general embodiment, said housing 5 comprises a connection rim to the brake 11 suitable to couple said housing 5 to a brake calliper 12 so as to interface said output side 10 to the brake and allow the movement of at least one brake pad 13 towards and away from a disc brake disc 14 and exert a braking action.

In accordance with a general embodiment, said output side 10 of the reducer 4 is locked axially Y-Y, or blocked from sliding out of said housing 5, by a stop ring 45 and said stop ring 45 is constrained to said at least one chamber wall or mantle 7, so that said output side of the reducer 10 is pack-closed between said support plate 8 and said stop ring 45.

In accordance with yet another general embodiment, a brake gear motor group 1 comprises:
 an electric motor 2 having a motor shaft 3;
 a reducer 4 operatively connected, with its input side 9, to said motor shaft 3, to receive a movement and a driving torque and transmit them with its side output 10 to the brake;
 a housing 5 having at least one chamber 6,28,29;
 said at least one chamber 6,28,29 being at least partly delimited by at least one chamber wall or mantle 7.

In accordance with a general embodiment, a support plate 8 is provided in said housing.

In accordance with a general embodiment, said motor 2 is accommodated, at least in part, in said at least one chamber 28 and said drive shaft 3 is supported freely rotatable in said support plate 8.

In accordance with a general embodiment, said reducer 4 is accommodated in said at least one chamber 6,29.

In accordance with a general embodiment, said reducer 4 is supported freely rotatable in said support plate 8.

In accordance with a general embodiment, said housing 5 comprises a connection rim to the brake 11 suitable to couple said housing 5 to a brake calliper 12 so as to interface said output side 10 to the brake and allow the movement of at least one brake pad 13 towards and away from a disc brake disc 14 and exert a braking action.

In accordance with a general embodiment, said support plate 8 divides said housing in three chambers 6,28,29,
 a first chamber 6 accommodates the output side 10 of the reducer 4,
 a second chamber 28 houses at least a part of the electric motor 2,
 a third chamber 29 houses the input side 9 of the reducer 4 or side of the reducer connected to the electric motor 2, wherein
 said second chamber 28 is closed by a first cover 40 substantially cup-shaped, selected from a set of cup-shaped covers, that forms a first cover compartment 46 of a predefined size and suitable for housing a portion of a specific size of electric motor 2, in order to adapt said brake gear motor group 1 to different applications, by changing only said first cover 40 in said of first covers, and keeping the housing 5 unchanged.

In accordance with yet another general embodiment, a brake gear motor group 1 comprises:
 an electric motor 2 having a motor shaft 3;
 a reducer 4 operatively connected, with its input side 9, to said motor shaft 3, to receive a movement and a driving torque and transmit them with its side output 10 to the brake;
 a housing 5 having at least one chamber 6,28,29;
 said at least one chamber 6,28,29 being at least partly delimited by at least one chamber wall or mantle 7.

In accordance with a general embodiment, a support plate 8 is provided in said housing.

In accordance with a general embodiment, said motor 2 is accommodated, at least in part, in said at least one chamber 28 and said drive shaft 3 is supported freely rotatable in said support plate 8.

In accordance with a general embodiment, said reducer 4 is accommodated in said at least one chamber 6,29.

In accordance with a general embodiment, said reducer 4 is supported freely rotatable in said support plate 8.

In accordance with a general embodiment, said housing 5 comprises a connection rim to the brake 11 suitable to couple said housing 5 to a brake calliper 12 so as to interface said output side 10 to the brake and allow the movement of at least one brake pad 13 towards and away from a disc brake disc 14 and exert a braking action.

In accordance with an embodiment, said reducer 4 is accommodated in said at least one chamber 6 by geometrically coupling its reducer seats 48 with the radial prominences of the reducer 47 provided in the chamber wall or mantle 7 that delimits at least one chamber 6, to discharge onto these prominences 47, and then on the housing 5, any torsion actions and/or axial actions on the reducer 4.

In accordance with yet another general embodiment, a brake gear motor group 1 comprises:
- an electric motor 2 having a motor shaft 3;
- a reducer 4 operatively connected, with its input side 9, to said motor shaft 3, to receive a movement and a driving torque and transmit them with its side output 10 to the brake;
- a housing 5 having at least one chamber 6,28,29;
- said at least one chamber 6,28,29 being at least partly delimited by at least one chamber wall or mantle 7.

In accordance with a general embodiment, a support plate 8 is provided in said housing.

In accordance with a general embodiment, said motor 2 is accommodated, at least in part, in said at least one chamber 28 and said drive shaft 3 is supported freely rotatable in said support plate 8.

In accordance with a general embodiment, said reducer 4 is accommodated in said at least one chamber 6,29.

In accordance with a general embodiment, said reducer 4 is supported freely rotatable in said support plate 8.

In accordance with a general embodiment, said housing 5 comprises a connection rim to the brake 11 suitable to couple said housing 5 to a brake calliper 12 so as to interface said output side 10 to the brake and allow the movement of at least one brake pad 13 towards and away from a disc brake disc 14 and exert a braking action.

In accordance with an embodiment, said electric motor 2 is accommodated in said at least one chamber 28 by geometrically coupling its motor seats 49 with the radial motor prominences 50 provided in the wall or mantle 51 that delimits said at least one chamber 28, to discharge onto these prominences 50, and then on the housing 5, the torsion actions and/or axial actions in the motor.

In accordance with yet another general embodiment, a brake gear motor group 1 comprises:
- an electric motor 2 having a motor shaft 3;
- a reducer 4 operatively connected, with its input side 9, to said motor shaft 3, to receive a movement and a driving torque and transmit them with its side output 10 to the brake;
- a housing 5 having at least one chamber 6,28,29;
- said at least one chamber 6,28,29 being at least partly delimited by at least one chamber wall or mantle 7.

In accordance with a general embodiment, a support plate 8 is provided in said housing.

In accordance with a general embodiment, said motor 2 is accommodated, at least in part, in said at least one chamber 28 and said drive shaft 3 is supported freely rotatable in said support plate 8.

In accordance with a general embodiment, said reducer 4 is accommodated in said at least one chamber 6,29.

In accordance with a general embodiment, said reducer 4 is supported freely rotatable in said support plate 8.

In accordance with a general embodiment, said housing 5 comprises a connection rim to the brake 11 suitable to couple said housing 5 to a brake calliper 12 so as to interface said output side 10 to the brake and allow the movement of at least one brake pad 13 towards and away from a disc brake disc 14 and exert a braking action.

In accordance with an embodiment, said motor 2 defines a first axial direction X-X; said reducer 4, at its reducer output side 10, defines a second axial direction Y-Y and said support plate 8 is connected to said housing 5 so as to delimit three chambers 6,28,29, two of which open or that face in the same direction as the axial direction X-X or Y-Y and one that faces the opposite direction, and two of said three chambers 28,29 are closed by a first cover 40 and a second cover 41, while the third chamber 6 is suitable to connect, through a connection aperture of the group to the brake 18, to a brake calliper 12.

Thanks to the provision of the characteristics described above, it is possible to obtain a gear motor group for brake calliper, and a brake calliper, as well as a brake that, on the one hand are able to reduce the noise generated by the operation of the gear motor and, on the other hand, do not introduce play and, in any case, related movements between the various support structures of the kinematic train. At the same time, thanks to the solutions proposed here, it is possible to obtain a gear motor group for disk brake, and a disk brake, that are easy to assemble and flexible, allowing their application to braking systems of different power, avoiding the redesign of the whole group and especially the layout of the housing of the gear motor, which strongly influences the bulk of the braking system and the entire wheel-suspension assembly of the vehicle.

Moreover, thanks to the provision of the characteristics of the group according to the invention, it is possible to obtain the integration of the support plate to the housing, allowing among other things:
- the integration of these support plate and housing components, which realize the structure of the gear motor, allowing greater precision in the assembly and operation of the transmission due to the fact that there are fewer coupling tolerances (the chain of tolerance is reduced);
- often, as performance demands increase, it is useful to change the type and characteristics of the electric motor. The performance of the motors, while keeping the technology and materials used fixed, increase, for example, as the size increases (diameter or length). In the case of increasing only the motor length (solution often adopted because less invasive and costly than increasing the diameter), this solution allows to maintaining the housing unchanged, which in itself is very expensive to redesign and produce, and only changing the depth of the seat of the first cup-shaped cover (definitely more economical to produce than the housing).

Obviously, a person skilled in the art, in order to satisfy contingent and specific needs, may make numerous modifications and variations to the group according to the invention, all however contained within the scope of the invention as defined by the following claims.

REFERENCES 1 brake gear motor group
2 electric motor
3 motor shaft
4 reducer
5 housing
6 at least one chamber—first chamber
7 at least one chamber wall or mantle
8 support plate
9 reducer input side
10 reducer output side
11 connecting rim to the brake
12 brake calliper
13 brake pad
14 disk brake disc
15 annular retention seat
16 first elastic means 17 first portion of elastic means
18 connection aperture of the group to the brake
19 second portion of elastic means
20 first elastic means body portion
21 gear cascade
22 planetary gear
23 axial protuberances
24 external surface of first portion of elastic means
25 radial prominences of first portion of elastic means
26 radial ring
27 annual body of second portion of the elastic means
28 second chamber
29 third chamber
30 active end of the motor
31 first plurality of satellites
32 second plurality of satellites
33 first satellite-holder stage
34 seconds satellite-holder stage
35 toothed crown
36 coupling mesh
37 movement mechanism of a brake calliper actuator
38 first braking surface
39 second braking surface
39 first cover
40 first cover
41 second cover
42 first bearing of support and free rotation on the support plate for the motor shaft
43 second bearing of support and free rotation of the pin
44 third bearing of support and rotation of the secondary wheel
45 stop ring
46 first cover compartment
47 radial reducer prominences
48 reducer seat
49 motor seat
50 motor radial prominences
51 motor seat wall or mantle
52 first support plate surface
53 second support plate surface
54 crown radial prominences
55 of stop ring radial seat
56 stop ring teeth
57 flat plate ring body
58 ring body radial prominences
59 second elastic means
60 pinion
61 non-motorised wheel
62 non-motorised wheel pin
63 secondary toothed wheel
64 thrust plate
65 first thrust plate surface
66 second thrust plate surface
67 groove or lowering of the thrust plate
68 third elastic means
69 reinforcement ribs of the support plate
70 support ribs of the thrust plate
71 angular centring rib
72 septum
73 calliper body
74 first vehicle side portion
75 thrust means
76 first pad seat
77 seats for electrical contacts
78 electrical contacts of the motor
79 electrical contacts of the motor
80 braids
81 fourth elastic means
82 drawn annular portion
83 shaped elastic ring
84 wave spring
85 secondary wheel support pin

The invention claimed is:
1. A brake gear motor group, comprising:
an electric motor having a motor shaft;
a reducer operatively connected, with its input side, to said motor shaft, to receive a movement and a driving torque and transmit them with its side output to the brake, the reducer including a planetary gear;
a housing having at least one chamber; and
said at least one chamber being at least partly delimited by at least one chamber wall
wherein
a support plate is provided in said housing,
said motor is accommodated, at least in part, in said at least one chamber,
said motor shaft is supported freely rotatable in said support plate,
said reducer is accommodated in said at least one chamber,
said reducer is supported freely rotatable in said support plate, and
said housing comprises a connection rim to the brake suitable to couple said housing to a brake calliper so as to interface with said output side of the brake and allow the movement of at least one brake pad towards and away from a disc brake disc and exert a braking action;
said support plate divides said at least one chamber into a first chamber, a second chamber, and a third chamber, wherein
the first chamber accommodates the output side of the reducer,
the second chamber houses at least a part of the electric motor, and
the third chamber houses the input side of the reducer connected to the electric motor,
said second chamber is closed by a first cover, the first cover being substantially cup-shaped and having a predefined size, the second chamber closed the first cover forming a first cover compartment configurable for housing a portion of the electric motor, in order to adapt said brake gear motor group to different applications, by changing the first cover, and keeping the housing unchanged,
said support plate is connected to said housing so as to delimit the three chambers, two of which open in the same axial direction, and one that faces in the opposite direction,
said third chamber is closed by a second cover, while the first chamber is suitable to connect through a connection aperture of the brake gear motor group to the brake to a brake caliper,
said first chamber houses at least the planetary gear, and
wherein
said connection rim defines a connection aperture of the brake gear motor group to the brake,
said connection rim comprises an annular retention seat,
said brake gear motor group comprises a first elastic means,
said first elastic means comprise a first portion of elastic means accommodated in said at least one chamber substantially astride said connection aperture, interposed between said reducer and the brake caliper, and said first elastic means comprise a second portion of elastic means accommodated in said annular retention seat and interposed between said housing and said brake calliper.

2. The brake gear motor group according to claim 1, wherein said electric motor defines a first axial direction, said reducer, at its reducer output side, defines a second axial direction, and said first axial direction (X-X) is parallel to said second axial direction (Y-Y).

3. The brake gear motor group according to claim 1, wherein:
said support plate is in one piece with said housing.

4. The brake gear motor group according to claim 1, wherein:
said support plate is in one piece with said housing;
said support plate divides said housing into the three chambers;
the first chamber accommodates the output side of the reducer;
the second chamber houses said electric motor;
the third chamber houses the input side of the reducer that receives the movement and driving torque from the electric motor; and
said support plate comprises support and free rotation bearings for the motor shaft and gears of the reducer.

5. The brake gear motor group according to claim 1, wherein:
said output side of the reducer is locked axially by a stop ring; and
said stop ring is constrained to said at least one chamber wall, so that said output side of the reducer is pack-closed between said support plate and said stop ring.

6. The brake gear motor group according to claim 1, wherein:
said chamber wall includes radial prominences of the reducer; and
said reducer is accommodated in said at least one chamber by geometrically coupling its reducer seats with the radial prominences of the reducer provided in the chamber wall that delimits at least one chamber, to discharge onto said radial prominences, and then on the housing, the torsion actions and axial actions on the reducer.

7. The brake gear motor group according to claim 1, wherein said electric motor is accommodated in said at least one chamber by geometrically coupling its motor seats with radial motor prominences provided in the wall that delimits said at least one chamber, to discharge onto said radial motor prominences and then on the housing, the torsion actions and axial actions in the electric motor.

8. The brake gear motor group of claim 1, further comprising a gear train that connects said motor shaft to the planetary gear, wherein said planetary gear extends along an axis parallel to a second axial direction.

9. The brake gear motor group of claim 1 wherein:
said first elastic means comprises a first portion of elastic means accommodated in said at least one chamber substantially astride said connection aperture interposed between said reducer and the brake calliper; and
said first elastic means comprises a second portion of elastic means accommodated in said annular retention seat and interposed between said housing and said brake caliper.

10. The brake gear motor group of claim 1 wherein:
said first portion of elastic means and said second portion of the elastic means comprise a single piece, obtained by co-extrusion of two different materials;
said first portion of elastic means and said second portion of elastic means are made of different materials;
said first portion of elastic means comprises a damper able to dampen the vibrations of the brake gear motor group;
said first portion of elastic means comprises a means to reduce noise coming from the gear motor group; and
said second portion is made of a material suitable to ensure the seal between the housing and the brake caliper.

11. The brake gear motor group of claim 1 wherein:
said first portion of elastic means comprises an annular first elastic means body portion from which project axial protuberances, substantially directed along a second axial direction;
said axial protuberances are a plurality of axial protuberances distributed equally spaced along the annular extension of the first portion of elastic means and facing the reducer; and
said axial protuberances have the form of semi-spherical caps, in order to make gradual the increase of the contact area to the facing component during their crushing; the plurality of axial protuberances is of a pre-defined number and proportional to the intensity of the elastic/damping characteristic desired.

12. The brake gear motor group of claim 1 wherein:
said first portion of elastic means comprises an external surface of first elastic means body portion suitable to face the surface, wall that delimits said at least one chamber;
radial projections of said first portion of elastic means are provided projecting radially from said first portion of the elastic means;
said radial projections of first portion of elastic means have maximum radial dimension capable of interfering with said connection aperture of the group to the brake and with said at least one chamber wall, so as to allow a pre-assembly of the first elastic means in said housing and preventing their fall;
said first portion of elastic means comprises an a first elastic means body portion of annular shape and substantially rectangular cross-section;
the second portion of elastic means extends radially to form an annular body of second portion of elastic means; and
said annular body of second portion elastic means has a substantially circular cross section.

13. The brake gear motor group of claim 3, wherein at least one of:
said support plate comprises a first support plate surface facing said reducer input side of the reducer, said support plate comprises a second support plate surface facing said electric motor, and said support plate comprises a third support plate surface facing opposite said first support plate surface; and
said housing is divided by said support plate into the three chambers, and the first chamber of said three chambers houses at least the output side of the reducer.

14. The brake gear motor group of claim 1, wherein:
said planetary gear includes two pluralities of satellites;
the first plurality of satellites being supported by a first satellite-holder stage that, on the opposite side, meshes with the second plurality of satellites, supported in turn by a second satellite-holder stage;

said second satellite-holder stage has a coupling mesh for coupling to the movement mechanism of a brake caliper actuator, suitable to influence at least one brake pad in abutment against a braking surface of a disk brake disc;

said satellites are accommodated in a toothed crown that is keyed in said at least one chamber; and said toothed crown has radial crown prominences suitable to interfere with the chamber wall delimiting said first chamber, so as to keep said toothed crown in position during assembly of the gear motor group.

15. The brake gear motor group of claim 1, wherein at least one of:

said reducer is accommodated in said at least one chamber by geometrically coupling its reducer seats with radial prominences of the reducer provided in the chamber wall that delimits at least one chamber, to discharge onto these prominences, and then on the housing, the torsion actions and axial actions on the reducer; and said electric motor is accommodated in said at least one chamber by geometrically coupling its motor seats with radial motor prominences provided in the wall that delimits said at least one chamber, to discharge onto said radial motor prominences, and then on the housing, the torsion actions and axial actions in the electric motor, and between said motor seats and said radial motor prominences are provided fourth elastic means suitable to dampen the vibrations of the electric motor.

16. The brake gear motor group of claim 1, wherein:

said output side of the reducer is locked axially by a stop ring, and said stop ring is constrained to said at least one chamber wall, so that said output side of the reducer is pack-closed between said support plate and said stop ring; and said stop ring pack-closes said output side of the reducer against at least of one said support plate and radial crown prominences provided in said housing.

17. The brake gear motor group of claim 16, wherein at least one of:

said stop ring is inserted in a radial stop ring seat provided in said chamber wall of said at least one chamber, said stop ring comprises radial stop ring teeth that protrude radially so as to clamp the chamber wall of the said at least one chamber, and said radial stop ring teeth are folded back towards the connection aperture of the group to the brake so as to stick against said chamber wall in response to being pressed in extraction by said at least one chamber chamber, in the manner of grappling hooks;

said stop ring comprises an annular portion drawn and folded towards the connection aperture of the brake assembly so as to stick against said chamber wall in response to being pressed in extraction by said at least one chamber, in the manner of a single annular grappling hook;

said stop ring comprises a flat blade ring body, and said stop ring is suitable to support an axial thrust of said output side of the reducer;

said stop ring is made of at least one of plastic and metal.

18. The brake gear motor group of claim 1, wherein at least one of:

said reducer is accommodated in said at least one chamber by geometrically coupling its reducer seats with radial prominences of the reducer provided in the chamber wall that delimits at least one chamber, to discharge onto the radial prominences, and then on the housing, torsion actions and axial actions on the reducer; and said second chamber of the at least one chamber houses, at least partially, said electric motor, said second chamber houses the active end of the motor of the electric motor.

19. The brake gear motor group of claim 1, wherein:

said support plate comprises a first bearing of support and free rotation on the support plate for the motor shaft;

said support plate comprises a pair of seats for electrical contacts suitable to receive electrical contacts of the electric motor to which are connected gear motor wiring braids to a power supply and control system of a vehicle.

20. The brake gear motor group of claim 1, wherein:

said first cover connects housing pack-clamps to the electric motor against radial motor prominences provided in the wall that delimits at least one chamber, said first cover connecting the electric motor against said support plate to the housing pack-clamps;

between said first cover and said electric motor are interposed a second elastic means, suitable to dampen the vibrations and reduce the noise produced by operation of the gear motor group;

said second elastic means is an O-ring;

said second elastic means are made of vibration and noise-damping material;

said housing delimits a third chamber that houses said input side of the reducer;

said third chamber houses gear train;

said motor shaft is supported by said support plate and protrudes with one of its ends from the opposite side with respect to the electric motor, projecting in said third chamber to connect operatively to the input side of the reducer;

the input side of the reducer connects to the gear train;

said gear train comprises a pinion keyed on said motor shaft;

said gear train comprises a non-motorised wheel that engages said pinion;

said non-motorised wheel is keyed onto a non-motorised wheel pin supported by said support plate;

said gear train comprises a secondary toothed wheel meshed with said non-motorised wheel;

said gear train comprises gears arranged side by side, allowing positioning the motor axis parallel to the axis of the output side of the reducer, making the brake gear motor group compact, said brake gear motor group further comprises a thrust plate connected to said support plate forming an abutment for the reducer;

said thrust plate comprises one or more first thrust plate surfaces facing said reducer;

said thrust plate comprises a second-thrust plate surface on the opposite side to said reducer;

said thrust plate includes a groove for lowering of the thrust plate, which receives, without entering into contact, the motor shaft and the pinion, avoiding interfering with the pinion and motor shaft, and avoiding influencing, with an axial reaction, the electric motor and interfering with the action of the second elastic means;

between said thrust plate and said second cover are interposed third elastic means; and said third elastic means are made of a material suitable to dampen the vibrations of the gear motor group and reduce noise during its operation.

21. The brake gear motor group of claim 1, wherein:
the support plate comprises a first bearing of support and free rotation for the motor shaft, said bearing is realized by avoiding an interposition of elastic means in order to avoid sagging in a kinematic chain that would reduce the readiness of response of the brake gear motor group;
the support plate comprises a non-motorised wheel bearing, said non-motorised wheel bearing is realized on the support plate avoiding the interposition of elastic means in order to avoid sagging in the kinematic chain that would reduce the readiness of response of the brake gear motor group; and
said support plate comprises a secondary wheel bearing, said secondary wheel bearing is realized on the support plate avoiding the interposition of elastic means in order to avoid sagging in the kinematic chain that would reduce the readiness of response of the brake gear motor group.

22. The brake gear motor group of claim 1, wherein said reducer comprises at least one of:
straight-tooth gears; and
helical-toothed gears in order to allow a greater and continuous grip between the gears of the reducer, reducing meshing vibration and noise.

23. The brake gear motor group of claim 1, wherein:
the electric motor is supported, and its rotation contrasted, by a shape coupling with radial prominences provided in the wall of the second chamber, in which said radial prominences are accommodated with geometrical coupling in radial seats provided in the electric motor;
said radial prominences allow supporting the electric motor also in the axial direction, avoiding directly loading the support plate;
said housing is made of synthetic material, while the radial prominences are implemented with metal inserts set in the body of the housing;
the reducer output side gear is supported, and its rotation contrasted by the shape coupling with radial reducer prominences provided in the wall of the first chamber, in which said radial reducer prominences are accommodated with geometric coupling in radial seats provided in the output side of the reducer;
said radial prominences allow supporting the output side of the reducer also in the axial direction, avoiding directly loading the support plate;
said housing is made of synthetic material and the reducer output side radial support prominences are metal inserts set in the body of the housing; and
said support plate comprises reinforcement ribs that allow lightening the group while, at the same time, avoid weakening it.

24. The brake gear motor group of claim 1, wherein:
the brake gear motor group further comprises a thrust plate connected to said support plate forming an abutment for the reducer;
said input side of the reducer connects to a gear train;
said gear train comprises a non-motorised wheel;
said support plate comprises a non-motorised wheel bearing;
said support plate includes ribs for supporting the thrust plate on the support plate while avoiding axially loading the electric motor and reducer and creating a space for free rotation of the gear train;
said support plate comprises an angular centering rib that is geometrically coupled with a septum of the thrust plate;
said non-motorised wheel is keyed onto a pin supported by a first end of the support plate and by the thrust plate on the other end;
said pin also performs the function of a centering pin of the thrust plate on the support plate; and
said pin is co-moulded with the support plate.

25. A calliper for a disc brake, comprising:
a calliper body suitable to sit astride a brake disc, the brake disc having a first braking surface and a second braking surface;
said calliper body comprising a first vehicle side portion suitable to face said first braking surface of the brake disc, which comprises thrust means housed in it;
said first portion comprising at least one first seat suitable to receive at least a first pad, suitable to face and be placed substantially parallel to said first braking surface;
said at least one first pad is slidingly accommodated in said at least one first seat so as to be positioned between said first vehicle side portion and said first braking surface to abut against said first braking surface and exert a braking action on the brake disc when influenced by the thrust means;
wherein said calliper comprises a gear motor group, comprising
an electric motor having a motor shaft,
a reducer operatively connected, with its input side, to said motor shaft, to receive a movement and a driving torque and transmit them with its side output to the brake, the reducer including a planetary gear,
a housing having at least one chamber, and
said at least one chamber being at least partly delimited by at least one chamber wall,
wherein
a support plate is provided in said housing,
said motor is accommodated, at least in part, in said at least one chamber,
said motor shaft is supported freely rotatable in said support plate,
said reducer is accommodated in said at least one chamber,
said reducer is supported freely rotatable in said support plate, and
said housing comprises a connection rim to the brake suitable to couple said housing to a brake calliper so as to interface with said output side of the brake and allow the movement of at least one brake pad towards and away from a disc brake discand exert a braking action;
said support plate divides said at least one chamber into a first chamber, a second chamber, and a third chamber, wherein
the first chamber accommodates the output side of the reducer,
the second chamber houses at least a part of the electric motor, and
the third chamber houses the input side of the reducer connected to the electric motor,
said second chamber is closed by a first cover, the first cover being substantially cup-shaped and having a predefined size, the second chamber closed the first cover forming a first cover compartment configurable for housing a portion of the electric motor, in order to adapt said brake gear motor group to different applications, by changing the first cover, and keeping the housing unchanged, said support plate is connected to said housing so as to delimit the three chambers, two of which open in the same axial direction, and one that faces in the opposite direction, said third chamber is closed by a second cover, while the first chamber is suitable to connect through a connection aperture of the brake gear motor group to the brake to a brake caliper, said first chamber houses at least the planetary gear said gear motor group is operatively connected to said thrust means, and wherein said connection rim defines a connection aperture of the brake gear motor group to the brake, said connection rim comprises an annular retention seat, said brake gear motor group comprises a first elastic means, said first elastic means comprise a first portion of elastic means accommodated in said at least one chamber substantially astride said connection aperture, interposed between said reducer and the brake caliper, and said first elastic means comprise a second portion of elastic means accommodated in said annular retention seat and interposed between said housing and said brake calliper.

26. The calliper of claim 25, further comprising the brake disc on which a calliper is placed astride, wherein said brake is a parking brake.

* * * * *